(12) United States Patent
Daley et al.

(10) Patent No.: US 12,440,281 B2
(45) Date of Patent: Oct. 14, 2025

(54) ROBOTIC SURGICAL SYSTEM WITH END EFFECTOR MARKER DIFFUSERS

(71) Applicant: Mobius Imaging, LLC, Shirley, MA (US)

(72) Inventors: Edward Daley, Maynard, MA (US); Paul Sebring, Townsend, MA (US); Gordon Row, Groton, MA (US)

(73) Assignee: Mobius Imaging, LLC, Shirley, MA (US)

( * ) Notice: Subject to any disclaimer, the term of this patent is extended or adjusted under 35 U.S.C. 154(b) by 330 days.

(21) Appl. No.: 18/204,477

(22) Filed: Jun. 1, 2023

(65) Prior Publication Data

US 2023/0389992 A1 Dec. 7, 2023

Related U.S. Application Data

(60) Provisional application No. 63/348,115, filed on Jun. 2, 2022.

(51) Int. Cl.
*A61B 34/20* (2016.01)
*A61B 34/30* (2016.01)
*A61B 90/00* (2016.01)

(52) U.S. Cl.
CPC ............. *A61B 34/20* (2016.02); *A61B 34/30* (2016.02); *A61B 90/39* (2016.02); *A61B 2034/2055* (2016.02); *A61B 2090/3937* (2016.02)

(58) Field of Classification Search
CPC ......... A61B 34/20; A61B 34/30; A61B 90/39; A61B 2034/2055; A61B 2090/3937; A61B 2034/2048; A61B 2034/2051; A61B 2034/2059; A61B 2090/3945; A61B 2090/3983

See application file for complete search history.

(56) References Cited

U.S. PATENT DOCUMENTS

| | | | |
|---|---|---|---|
| 7,725,162 B2 | 5/2010 | Malackowski et al. |
| 8,118,488 B2 | 2/2012 | Gregerson |
| 9,008,757 B2 | 4/2015 | Wu |
| 9,111,379 B2 | 8/2015 | Gregerson et al. |
| 9,119,655 B2 | 9/2015 | Bowling et al. |
| 9,801,592 B2 | 10/2017 | Stanton et al. |
| 9,962,132 B2 | 5/2018 | Gregerson |
| 10,151,810 B2 | 12/2018 | Gregerson et al. |
| 10,456,207 B2 | 10/2019 | Flatt |

(Continued)

*Primary Examiner* — Paula J Stice
(74) *Attorney, Agent, or Firm* — Howard & Howard Attorneys PLLC

(57) ABSTRACT

A surgical system includes a tool for engaging a target site, a navigation system including a localizer to track states of trackers, a patient tracker for attachment relative to the target site, a robotic arm to maintain alignment of the tool, and an end effector attached to the robotic arm to support the tool. The end effector includes an end effector tracker having markers each including a body having an inner bore surface defining a bore between an inlet and an outlet, a light module supported adjacent to the inlet and arranged to emit light into reflection with the inner bore surface, and a diffuser supported adjacent to the outlet to diffuse light reflected by the inner bore surface, the diffuser having an output surface arranged to present diffused light across the output surface detectable by the localizer of the navigation system to enable tracking states of the end effector.

20 Claims, 16 Drawing Sheets

(56) References Cited

U.S. PATENT DOCUMENTS

| | | |
|---|---|---|
| 10,959,783 B2 | 3/2021 | Gregerson et al. |
| 11,103,990 B2 | 8/2021 | Sebring et al. |
| 11,160,620 B2 | 11/2021 | Ebbitt et al. |
| 2014/0275953 A1 | 9/2014 | Gregerson et al. |
| 2017/0086941 A1* | 3/2017 | Marti ................. A61B 90/39 |
| 2019/0053858 A1* | 2/2019 | Kapoor ............... A61B 8/4254 |
| 2020/0078097 A1 | 3/2020 | Gregerson et al. |
| 2020/0146754 A1* | 5/2020 | Row .................... A61B 90/39 |

\* cited by examiner

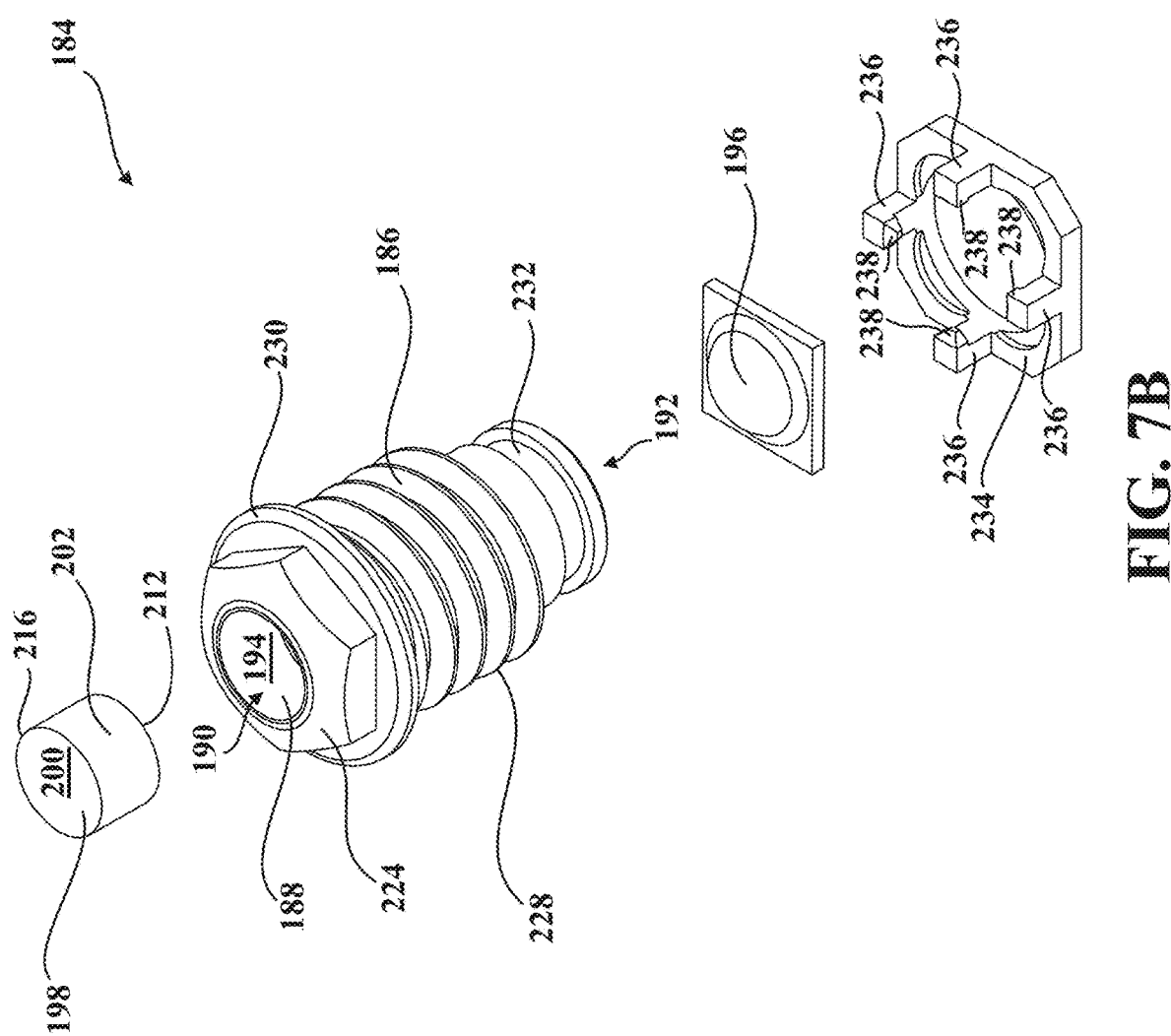

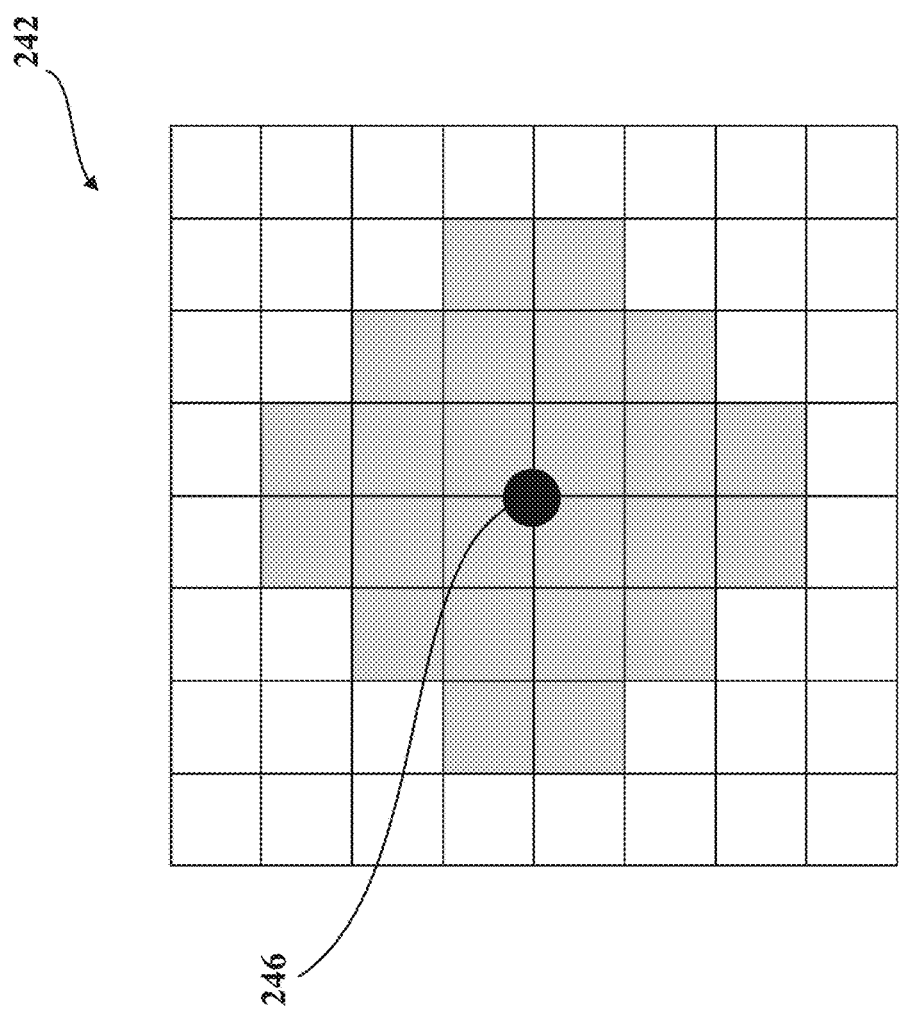

ROBOTIC SURGICAL SYSTEM WITH END EFFECTOR MARKER DIFFUSERS

CROSS-REFERENCE TO RELATED APPLICATION

The subject patent application claims priority to and all the benefits of U.S. Provisional Patent Application No. 63/348,115, filed on Jun. 2, 2022, the disclosure of which is hereby incorporated by reference in its entirety.

BACKGROUND

Surgical systems are frequently used to assist medical professionals in carrying out various types of surgical procedures. To this end, a surgeon may use a surgical system to guide, position, move, actuate, or otherwise manipulate various tools, components, prostheses, and the like during a surgery. Surgical systems may include surgical robots which can be used to assist surgeons in performing a number of different types of surgical procedures. By way of illustration, surgical robots are commonly used in procedures involving the correction, stabilization, resection, or replacement of one or more parts of a patient's body, such as to help improve patient mobility, reduce pain, mitigate the risk of subsequent injury or damage, and the like.

Certain types of surgical robots may include a robotic arm that positions a tool above the patient and along a desired trajectory that is aligned with the desired orientation of the tool relative to a surgical site on the patient. By way of illustrative example, in many types of spinal procedures, a robotic arm of a surgical robot positions a tool guide along the desired trajectory that is aligned with the desired orientation of the tool relative to vertebrae and/or discs of the patient's spine. It will be important that reliably and consistently maintaining alignment relative to the patient's anatomy help ensure that postoperative results match desired preoperative surgical plans.

In some cases, to assist in maintaining proper alignment of the tool guide and the tool relative to the surgical site on the patient, a navigation system is employed. Conventional navigation systems determine a pose of the tool with respect to the patient's anatomy so that the robotic arm can position the tool along the desired trajectory according to the surgeon's plan. To this end, navigation systems may include a localizer and trackers viewable by the localizer and attached to tracked objects so that the robotic system can monitor and respond to movement of tracked objects during the surgical procedure by dynamically moving the tool guide to as needed to maintain the desired trajectory of the tool. Certain types of trackers may include "active" markers defined by light emitting diodes capable of emitting light detectable by the localizer. However, depending on the type of light emitting diodes utilized, there may be significant variations in how light is emitted from different light emitting diodes (e.g., variations in emission intensity, shape, wavelength, and the like) when detected by the localizer from various angles and spatial perspectives.

Here, for example, certain types of light emitting diodes may be manufactured in ways that result in significant differences in emission intensity when viewed from the side compared to head-on. This can result in "washing out" the localizer so that certain light emitting diodes may not be clearly visible to the localizer when one is viewed head-on which, in turn, negatively impacts tracking accuracy. Here too, certain types of light emitting diodes may be manufactured in ways that causes their emitted light to, from the perspective of the localizer, change shape and/or shift in position in ways that do not necessarily correspond to movement of the light emitting diode itself, which can likewise negatively impact tracking accuracy. While light emitting diodes can be manufactured to ensure high consistency of light emission over time, these types of light emitting diodes tend to be relatively expensive.

Accordingly, there remains a need in the art for addressing one or more of these deficiencies.

SUMMARY

The present disclosure provides a surgical system including a tool for engaging a target site, a navigation system including a localizer to track states of trackers within a field of view, and a patient tracker adapted for attachment relative to a target site. The surgical system also includes a robotic arm configured to maintain alignment of the tool relative to the target site. The robotic arm extends between a base end and a mount end arranged for movement relative to the base end. The surgical system further includes an end effector attached to the mount end of the robotic arm and configured to support the tool.

The end effector includes an end effector tracker having a plurality of markers. Each marker includes a body having an inner bore surface defining a bore extending between an inlet and an outlet. Each marker also includes a light module supported adjacent to the inlet and arranged to emit light into reflection with the inner bore surface. Each marker further includes a diffuser supported adjacent to the outlet to diffuse light reflected by the inner bore surface emitted by the light module. The diffuser has an output surface arranged to present diffused light across the output surface detectable by the localizer of the navigation system to enable tracking states of the end effector.

Accordingly, diffused light presented across the output surface of the diffuser is consistent in intensity when the marker is detected by the localizer from various angles and spatial perspectives, including when viewed directly on. Consistent intensity of diffused light prevents the localizer from washing out, thus ensuring the localizer is able to detect light emitted from other end effector trackers and/or the patient trackers, and thus also ensuring the navigation system accurately monitors and responds to movement during the surgical procedure. Moreover, consistent intensity of diffused light ensures that the marker is detectable by the localizer when viewed from a perspective at a great angle from viewed directly on, thus further ensuring the navigation system accurately monitors and responds to movement during the surgical procedure.

BRIEF DESCRIPTION OF THE DRAWINGS

Other advantages of the present invention will be readily appreciated, as the same becomes better understood by reference to the following detailed description when considered in connection with the accompanying drawings.

FIG. 7B is an exploded view of the marker of FIG. 7A.

FIG. 9A is a schematic illustration of a predetermined arrangement of pixels represented in tracking data generated by an optical position sensor.

DETAILED DESCRIPTION

Figure 1:
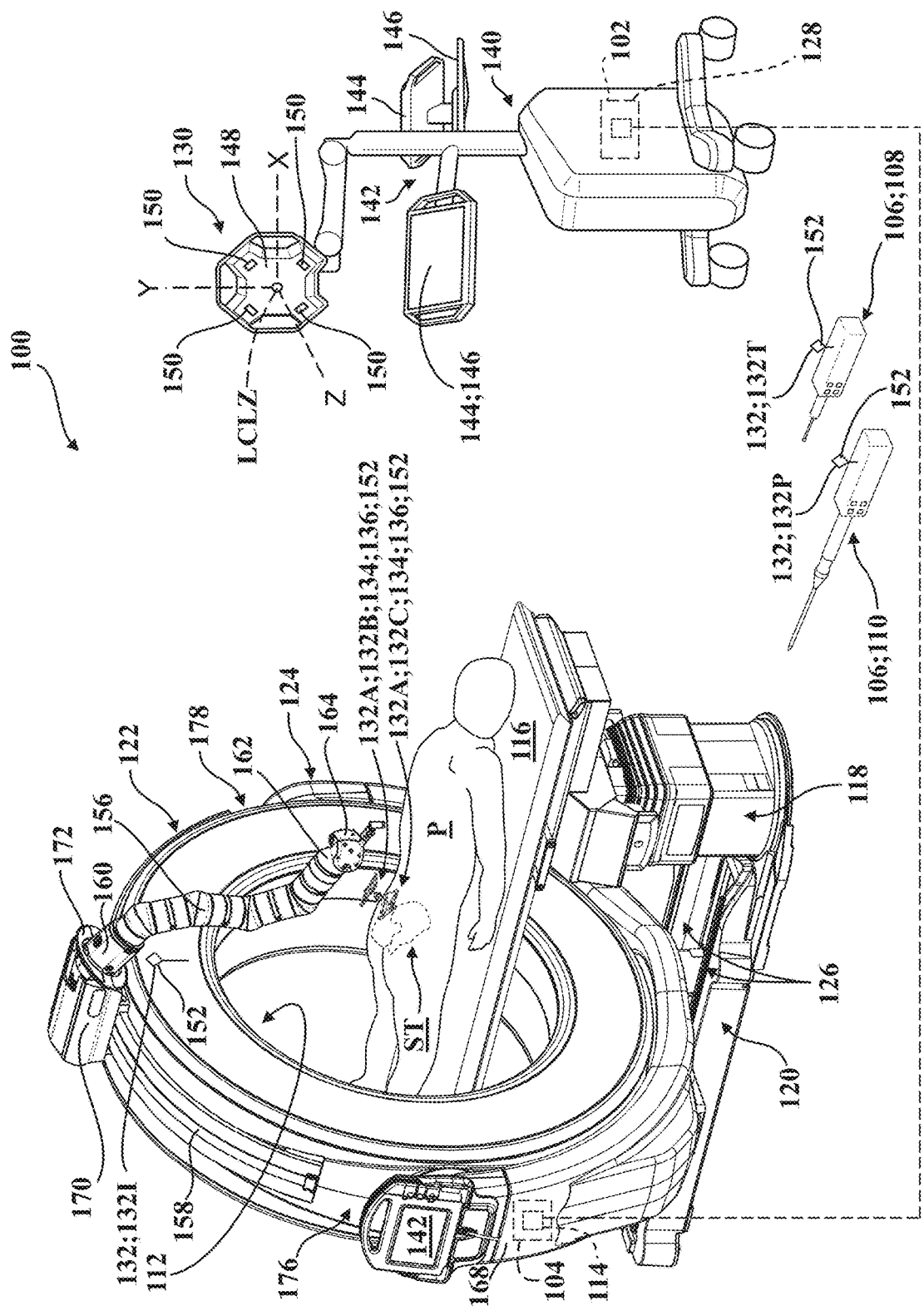
FIG. 1 is a perspective view of the surgical system, including a navigation system including a localizer to track states of trackers within a field of view, a patient tracker adapted for attachment relative to a target site, and a robotic arm configured to maintain alignment of a tool relative to the target site.

Referring now to the drawings, wherein like numerals indicate like or corresponding parts throughout the several views, a surgical system 100 is shown in FIG. 1 for treating a patient P. To this end, the illustrated surgical system 100 generally includes a navigation system 102, an imaging system 104, and one or more types of tools 106. As will be appreciated from the subsequent description below, the surgical system 100 is configured to, among other things, allow the surgeon to visualize, approach, and treat or otherwise manipulate anatomy of a patient P at a target site ST with a high level of control. To this end, imaging data ID of the target site ST may be acquired via the imaging system 104, and can be used to assist the surgeon in visualizing the patient's P anatomy at or otherwise adjacent to the target site ST. Here, the imaging data ID may also be utilized by the navigation system 102 to, among other things, facilitate navigation of tools 106 relative to the target site ST. Each of the components of the surgical system 100 introduced above will be described in greater detail below.

In FIG. 1, an operating room is shown with a patient P undergoing an exemplary surgical procedure performed using the surgical system 100. In this illustrative example, a minimally-invasive spinal surgical procedure, such as a posterior interbody spinal fusion, is being performed. It will be appreciated that this example is illustrative, and that other types of surgical procedures are contemplated. During the surgical procedure, one or more hand-held tools 106, such as a rotary tool 108 and/or a pointer tool 110, may be used by the surgeon. The tool 106 is for engaging the target site ST. As noted above and as is described in greater detail below, the navigation system 102 may be configured to track states of one or more of the tools 106 relative to the target site ST. In this exemplary surgical procedure, the rotary tool 108 may be employed as a cutting or drilling tool to remove tissue, form pilot holes (e.g., in the ilium, in vertebrae, and the like), or otherwise approach the target site ST. The rotary tool 108 may also be used to drive or otherwise install implantable components (e.g., pedicle screws, anchors, and the like).

For illustrative purposes, generically-depicted tools 106 configured for hand-held use are shown in FIG. 1. However, as will be appreciated from the subsequent description below, aspects of the surgical system 100 may be used with any suitable type of tool 106 without departing from the scope of the present disclosure. Furthermore, in addition to hand-held tools 106 of various types and configurations, aspects of the surgical system 100 may also be employed in connection with robotically-controlled tools 106 (not shown). Certain types of robotically-controlled tools 106 are disclosed in U.S. Pat. No. 9,119,655, entitled "Surgical Robotic arm Capable of Controlling a Surgical Instrument in Multiple Modes;" U.S. Pat. No. 10,456,207, entitled "Systems and Tools for use with Surgical Robotic Manipulators;" U.S. Pat. No. 11,160,620, entitled "End Effectors And Methods For Driving Tools Guided By Surgical Robotic Systems;" U.S. Pat. No. 10,959,783, entitled "Integrated Medical Imaging and Surgical Robotic System;" and U.S. Patent Application Publication No. 2020/0078097, entitled "Methods and Systems for Robot-Assisted Surgery," the disclosures of each of which are hereby incorporated by reference in their entirety.

As noted above, the imaging system 104 may be used to obtain imaging data ID of the patient, which may be a human or animal patient. In the representative version illustrated in FIG. 1, the imaging system 104 is realized as an x-ray computed tomography (CT) imaging device. Here, the patient P may be positioned within a central bore 112 of the imaging system 104 and an x-ray source and detector may be rotated around the central bore 112 to obtain raw x-ray imaging data ID of the patient P. The imaging data ID may be processed using an imaging system controller 114, or another suitable controller, in order to construct three-dimensional imaging data ID, two-dimensional imaging data ID, and the like, which may be transmitted to or otherwise utilized by the navigation system 102 or other components of the surgical system 100.

In some versions, imaging data ID may be obtained preoperatively (e.g., prior to performing a surgical procedure) or intraoperatively (e.g., during a surgical procedure) by positioning the patient P within the central bore 112 of the imaging system 104. In order to obtain imaging data ID, a portion of the imaging system 104 may be moved relative to a patient support 116 (e.g., a surgical table) on which the patient P is disposed while the patient P remains stationary.

Here, the patient support 116 is secured to the imaging system 104, such as via a column 118 which is mounted to a base 120 of the imaging system 104. A portion of the imaging system 104 (e.g., an O-shaped imaging gantry 122) which includes at least one imaging component may be supported by an articulable support 124 that can translate along the length of the base 120 on rails 126 to perform an imaging scan of the patient P, and may translate away from the patient P to an out-of-the-way position for performing a surgical procedure on the patient P.

An exemplary imaging system 104 that may be used in various versions is the AIRO® intra-operative CT system manufactured by Mobius Imaging, LLC. Examples of x-ray CT imaging devices that may be used according to various versions of the present disclosure are described in U.S. Pat. No. 10,151,810, entitled "Pivoting Multi-directional X-ray Imaging System with a Pair of Diametrically Opposite Vertical Support Columns Tandemly Movable Along a Stationary Base Support;" U.S. Pat. No. 9,962,132, entitled "Multi-directional X-ray Imaging System with Single Support Column;" U.S. Pat. No. 9,801,592, entitled "Caster System for Mobile Apparatus;" U.S. Pat. No. 9,111,379, entitled "Method and System for X-ray CT Imaging;" U.S. Pat. No. 8,118,488, entitled "Mobile Medical Imaging System and Methods;" and U.S. Patent Application Publication No. 2014/0275953, entitled "Mobile X-ray Imaging System," the disclosures of each of which are hereby incorporated by reference in their entirety.

While the illustrated imaging system 104 is realized as an x-ray CT imaging device as noted above, in other versions, the imaging system 104 may comprise one or more of an x-ray fluoroscopic imaging device, a magnetic resonance (MR) imaging device, a positron emission tomography (PET) imaging device, a single-photon emission computed tomography (SPECT), or an ultrasound imaging device. Other configurations are contemplated. In some versions, the imaging system 104 may be a mobile CT device that is not attached to the patient support 116 and may be wheeled or otherwise moved over the patient P and the patient support 116 to perform a scan. Examples of mobile CT devices include the BodyTom® CT scanner from Samsung Electronics Co., Ltd. and the O-arm® surgical imaging system form Medtronic, plc. The imaging system 104 may also be a C-arm x-ray fluoroscopy device. In other versions, the imaging system 104 may be a fixed-bore imaging device, and the patient P may be moved into the bore of the device, either on a patient support 116 or on a separate patient table that is configured to slide in and out of the central bore 112. Further, although the imaging system 104 shown in FIG. 1 is located close to the patient P within the operating room, the imaging system 104 may be located remotely, such as in another room or building (e.g., in a hospital radiology department).

The surgical system 100 employs the navigation system 102 to, among other things, track movement of various objects, such as the tools 106 and parts of the patient's P anatomy (e.g., tissue at the surgical site ST), as well as portions of the imaging system 104 in some versions. To this end, the navigation system 102 comprises a navigation controller 128 coupled to a localizer 130 that is configured to sense the position and/or orientation of trackers 132 within a localizer coordinate system LCLZ. In other words, the navigation system 102 includes the localizer 130 to track states of trackers 132 within a field of view. As is described in greater detail below, the trackers 132 (also referred to herein as "navigable trackers") are fixed, secured, or otherwise attached to specific objects, and are configured to be monitored by the localizer 130.

The navigation controller 128 is disposed in communication with the localizer 130 and gathers position and/or orientation data for each tracker 132 sensed by the localizer 130 in the localizer coordinate system LCLZ. The navigation controller 128 may be disposed in communication with the imaging system controller 114 (e.g., to receive imaging data ID) and/or in communication with other components of the surgical system 100 (e.g., robotic arm controllers, tool controllers, and the like; not shown). However, other configurations are contemplated. The controllers 114, 128 may be realized as computers, processors, control units, and the like, and may be discrete components, may be integrated, and/or may otherwise share hardware.

It will be appreciated that the localizer 130 can sense the position and/or orientation of multiple trackers 132 to track correspondingly multiple objects within the localizer coordinate system LCLZ. By way of example, and as is depicted in FIG. 1, trackers 132 may comprise a tool tracker 132T, a pointer tracker 132P, an imaging system tracker 132I, one or more patient trackers 132A (e.g., a first patient tracker 132A, a second patient tracker 132B, and the like), a robot tracker 132R, as well as additional patient trackers, trackers for additional medical and/or surgical tools, and the like. The patient tracker 132A is adapted for attachment relative to the target site ST.

Figure 2:
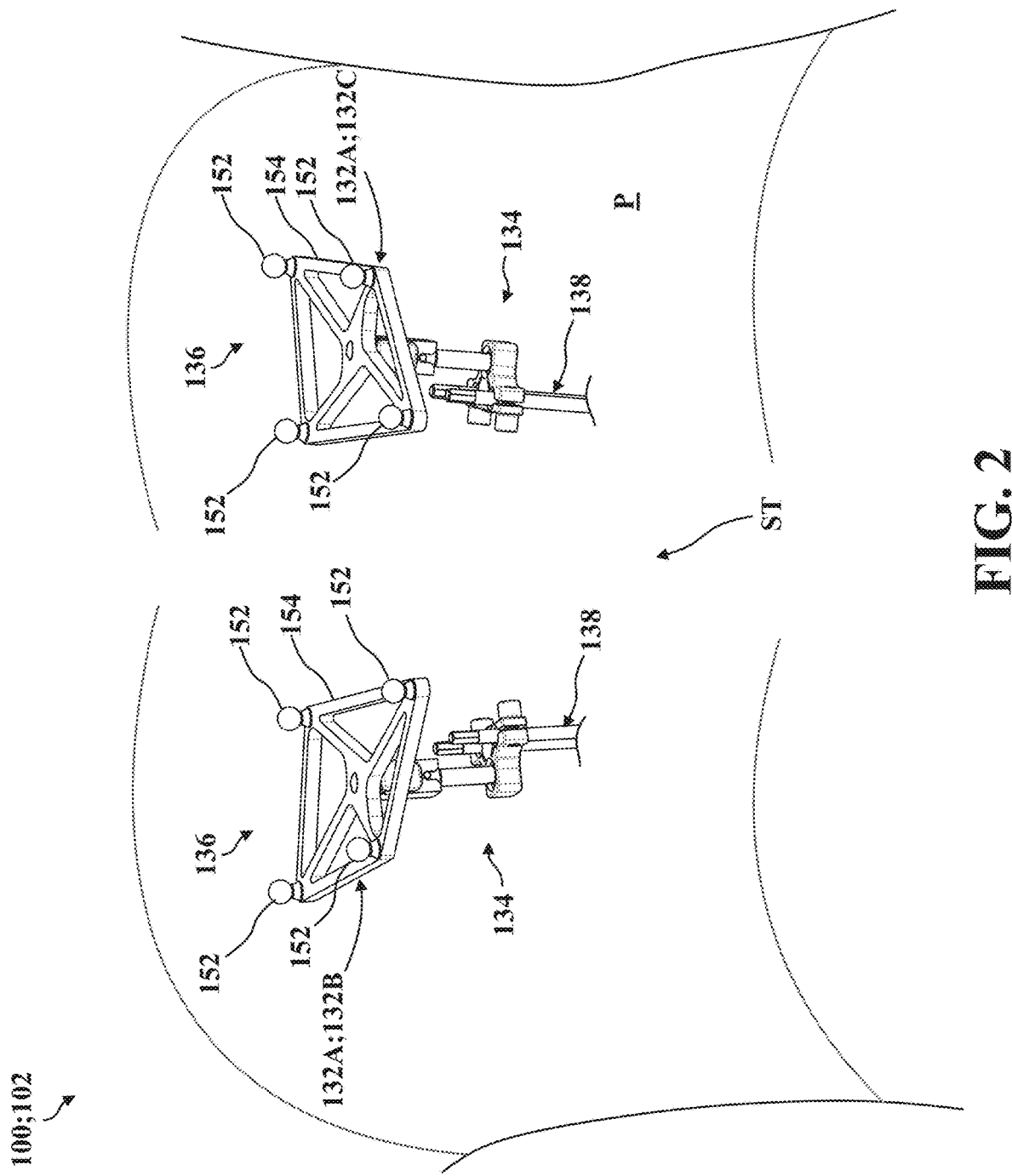
FIG. 2 is a perspective view of the patient tracker attached relative to the target site.
Figure 3:
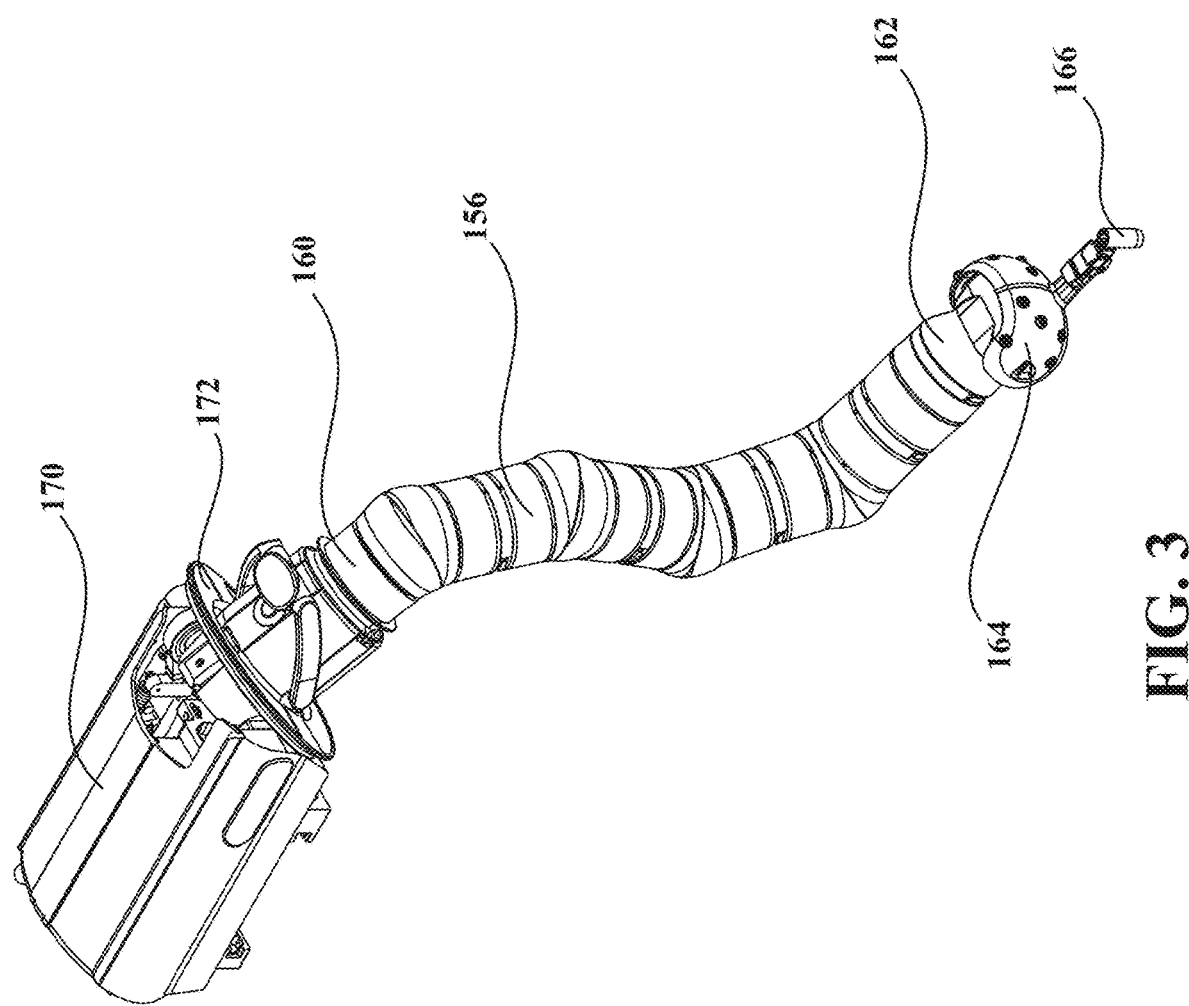
FIG. 3 is a perspective view of the robotic arm of FIG. 1, with the robotic arm extending between a base end and a mount end arranged for movement relative to the base end, with an end effector attached to the mount end of the robotic arm.

In FIG. 1, the tool tracker 132T, the pointer tracker 132P, and the imaging system tracker 132I are each depicted generically and are shown firmly fixed to (or otherwise integrated with) the rotary tool 108, the pointer tool 110, and the gantry 122 of the imaging system 104, respectively. The first and second patient trackers 132A, 132B, on the other hand, are removably coupled to mount assemblies 134 to define tracker assemblies 136 which facilitate selective movement of the trackers 132A, 132B relative to their mount assemblies 134 according to versions of the present disclosure, as described in greater detail below. As shown in FIG. 2, the tracker assemblies 136 are firmly fixed to different portions of the patient's P anatomy (e.g., to opposing lateral sides of the ilium) via anchors 138 which are configured to releasably engage tissue (e.g., bone). It will be appreciated that trackers 132 may be firmly affixed to different types of tracked objects (e.g., discrete bones, tools, pointers, and the like) in a number of different ways.

The position of the patient trackers 132A, 132B relative to the anatomy of the patient P to which they are attached can be determined by known registration techniques, such as point-based registration in which the pointer tool 110 (to which the pointer tracker 132P is fixed) is used to touch off on bony landmarks on bone, or to touch off on several points across the bone for surface-based registration. Conventional registration techniques can be employed to correlate the pose of the patient trackers 132A, 132B to the patient's anatomy. Other types of registration are also possible.

Position and/or orientation data may be gathered, determined, or otherwise handled by the navigation controller 128 using conventional registration/navigation techniques to determine coordinates of trackers 132 within the localizer coordinate system LCLZ. These coordinates may be utilized by various components of the surgical system 100 (e.g., to facilitate control of the tools 106, to facilitate navigation based on imaging data ID, and the like).

In the representative version illustrated in FIG. 1, the navigation controller 128 and the localizer 130 are supported on a mobile cart 140 which is movable relative to the base 120 of the imaging system 104. The mobile cart 140 also supports a user interface, generally indicated at 142, to facilitate operation of the navigation system 102 by displaying information to, and/or by receiving information from, the surgeon or another user. The user interface 142 may be disposed in communication with other components of the surgical system 100 (e.g., with the imaging system 104), and may comprise one or more output devices 144 (e.g., monitors, indicators, display screens, and the like) to present information to the surgeon (e.g., images, video, data, a graphics, navigable menus, and the like), and one or more input devices 146 (e.g., buttons, touch screens, keyboards, mice, gesture or voice-based input devices, and the like).

In some versions, the surgical system 100 is capable of displaying a virtual representation of the relative positions and orientations of tracked objects to the surgeon or other users of the surgical system 100, such as with images and/or graphical representations of the anatomy of the patient P and the tool 106 presented on one or more output devices 144 (e.g., a display screen). The navigation controller 128 may also utilize the user interface 142 to display instructions or request information from the surgeon or other users of the surgical system 100. Other configurations are contemplated. One type of mobile cart 140 and user interface 142 of this type of navigation system 102 is described in U.S. Pat. No. 7,725,162, entitled "Surgery System," the disclosure of which is hereby incorporated by reference in its entirety.

Because the mobile cart 140 and the gantry 122 of the imaging system 104 can be positioned relative to each other and also relative to the patient P in the representative version illustrated in FIG. 1, the navigation system 102 can transform the coordinates of each tracker 132 from the localizer coordinate system LCLZ into other coordinate systems (e.g., defined by different trackers 132, localizers 130, and the like), or vice versa, so that navigation relative to the target site ST (or control of tools 106) can be based at least partially on the relative positions and orientations of multiple trackers 132 within a common coordinate system (e.g., the localizer coordinate system LCLZ). Coordinates can be transformed using a number of different conventional coordinate system transformation techniques. It will be appreciated that the localizer 130 or other components of the navigation system 102 could be arranged, supported, or otherwise configured in other ways without departing from the scope of the present disclosure. By way of non-limiting example, the localizer 130 could be coupled to the imaging system 104 in some versions (e.g., to the gantry 122). Other configurations are contemplated.

In the illustrated version, the localizer 130 is an optical localizer and includes a camera unit 148 with one or more optical position sensors 150. The navigation system 102 employs the optical position sensors 150 of the camera unit 148 to sense the position and/or orientation of the trackers 132 within the localizer coordinate system LCLZ. To this end, the trackers 132 each employ one or more markers 152 (also referred to as "fiducials" in some versions) that are supported on an array 154 in a predetermined arrangement. However, as will be appreciated from the subsequent description below, trackers 132 may have different configurations, such as with different quantities of markers 152 that can be secured to or otherwise formed in other structures besides the arrays 154 illustrated throughout the drawings (e.g., various types of housings, frames, surfaces, and the like). Other configurations are contemplated.

In some versions, certain trackers 132 (e.g., the patient tracker 132A) may employ "passive" markers 152 (e.g., reflective markers such as spheres, cones, and the like) which reflect emitted light that is sensed by the optical position sensors 150 of the camera unit 148. In some versions, trackers 132 employ "active" markers 152 (e.g., light emitting diodes "LEDs"), which emit light that is sensed by the optical position sensors 150 of the camera unit 148. Examples of navigation systems 102 of these types are described in U.S. Pat. No. 9,008,757, entitled "Navigation System Including Optical and Non-Optical Sensors," the disclosure of which is hereby incorporated by reference in its entirety.

Although one version of the mobile cart 140 and localizer 130 of the navigation system 102 is illustrated in FIG. 1, it will be appreciated that the navigation system 102 may have any other suitable configuration for monitoring trackers 132 which, as will be appreciated from the subsequent description below, may be of various types and configurations and could employ various types of markers 152. Thus, for the purposes of clarity and consistency, the term "marker 152" is used herein to refer to a portion of a tracker 132 (e.g., a passive or active marker 152 mounted to an array 154 or otherwise coupled to a tracked object) that can be monitored by a localizer 130 to track (e.g., states, motion, position, orientation, and the like) of the object to which the tracker 132 is secured, irrespective of the specific type or configuration of the localizer 130 and/or tracker 132.

In some versions, the navigation system 102 and/or the localizer 130 could be radio frequency (RF) based. For example, the navigation system 102 may comprise an RF transceiver coupled to the navigation controller 128. Here, certain trackers 132 may comprise markers 152 realized as RF emitters or transponders, which may be passive or may be actively energized. The RF transceiver transmits an RF tracking signal, and the RF emitters respond with RF signals such that tracked states are communicated to (or interpreted by) the navigation controller 128. The RF signals may be of any suitable frequency. The RF transceiver may be positioned at any suitable location to track the objects using RF signals effectively. Furthermore, it will be appreciated that versions of RF-based navigation systems may have structural configurations that are different than the navigation system 102 illustrated throughout the drawings.

In some versions, the navigation system 102 and/or localizer 130 may be electromagnetically (EM) based. For example, the navigation system 102 may comprise an EM transceiver coupled to the navigation controller 128. Here, certain trackers 132 may comprise markers 152 realized as EM components (e.g., various types of magnetic trackers, electromagnetic trackers, inductive trackers, and the like), which may be passive or may be actively energized. The EM transceiver generates an EM field, and the EM components respond with EM signals such that tracked states are communicated to (or interpreted by) the navigation controller 128. The navigation controller 128 may analyze the received EM signals to associate relative states thereto. Here too, it will be appreciated that versions of EM-based navigation systems may have structural configurations that are different than the navigation system 102 illustrated throughout the drawings.

Those having ordinary skill in the art will appreciate that the navigation system 102 and/or localizer 130 may have any other suitable components or structure not specifically recited herein. Furthermore, any of the techniques, methods, and/or components described above with respect to the camera-based navigation system 102 shown throughout the drawings may be implemented or provided for any of the other versions of the navigation system 102 described herein. For example, the navigation system 102 may also be based on one or more of inertial tracking, ultrasonic tracking, image-based optical tracking (e.g., with markers 152 are defined by patterns, shapes, edges, and the like that can be monitored with a camera), or any combination of tracking techniques. Other configurations are contemplated.

As shown in FIG. 1, the surgical system 100 may include a robotic arm 156 operatively attached to a support element 158 and configured to maintain alignment of the tool 106 relative to the target site ST. The robotic arm 156 may extend between a base end 160 and a mount end 162 arranged for movement relative to the base end 160. The surgical system 100 may further includes an end effector 164 attached to the mount end 162 of the robotic arm 156 and configured to support one or more types of tools 106, instruments, and the like. More specifically, the surgical system 100 may further include a tool guide 166 supported by the end effector 164, and the tool guide 166 may be configured to support the tool 106 relative to a trajectory that is aligned or otherwise determined relative to the surgical site ST on the patient P.

The robotic arm 156 may comprise a multi-joint arm that includes a plurality of linkages connected by joints having actuator(s) and optional encoder(s) (not shown in detail) to enable the linkages to bend, rotate and/or translate relative to one another in response to control signals from a robot control system. The robotic arm 156 may be fixed to the imaging system 104, such as on the support element 158 (e.g. a curved rail) that may extend concentrically over the outer surface of the O-shaped imaging gantry 122 of the imaging system 104 and that may be located close to the target site ST of the patient P. In some versions, the robotic arm 156 could be coupled to a mobile cart (not shown) or to another type of support element 158 that is not necessarily coupled to the imaging system 104. Although a single robotic arm 156 is shown in FIG. 1, it will be understood that the surgical system 100 may include multiple robotic arms attached to suitable support structure(s). Other configurations are contemplated.

The support element 158 may form a semicircular arc and may be concentric with the outer circumference of the O-shaped imaging gantry 122. The support element 158 may extend around at least 25%, such as between about 30-50% of the outer circumference of the O-shaped imaging gantry 122. The support element 158 may extend around at least a portion of the outer circumference of the O-shaped imaging gantry 122 that is located above the target site ST of the patient P. More specifically, the base end 160 of the robotic arm 156 (e.g., the end of the robotic arm 156 opposite the end effector 164) may be fixed to the support element 158, in a non-limiting example, at a position that is less than about 2 meters, such as less than about 1 meter (e.g., between 0.5 and 1 meter) from the surgical site ST of the patient P during a surgical procedure.

In versions, the support element 158 may extend along a semicircular arc having a radius that is greater than about 33 inches, such as greater than about 35 inches (e.g., between 33 and 50 inches). The support element 158 may be spaced from the outer surface of the O-shaped imaging gantry 122 by a pre-determined distance, which may be from less than an inch (e.g., 0.5 inches) to 6 or 10 inches or more. In some versions, the support element 158 may be spaced from the O-shaped imaging gantry 122 by an amount sufficient to enable the tilt motion of the O-shaped imaging gantry 122 with respect to a gimbal 168 supporting the O-shaped imaging gantry 122 over at least a limited range of motion. Additionally, in some versions, the support element 158 may comprise one or more straight segments (e.g., rail segments), where at least a portion of the support element 158 may extend over the top surface of the O-shaped imaging gantry 122. Other configurations are contemplated.

A carriage 170 may be located on the support element 158 and may include a mounting surface 172 for mounting the base end 160 of the robotic arm 156 to the carriage 170. As shown in FIG. 1, the carriage 170 may extend from the support element 158 towards a first (e.g., front) face of the O-shaped imaging gantry 122. The mounting surface 172 for the robotic arm 156 may extend beyond the first (e.g., front) face of the O-shaped imaging gantry 122 and the robotic arm 156 may extend over the first (e.g., front) face of the O-shaped imaging gantry 122. In some versions, the configuration of the carriage 170 and the mounting surface 172 may be reversed such that the mounting surface 172 extends beyond the second (e.g., rear) face of the O-shaped imaging gantry 122, and the robotic arm 156 may extend over the second (e.g., rear) face of the O-shaped imaging gantry 122. In this configuration, the patient support 116 may be configured such that the patient support 116 and patient P extend into or through the central bore 112 defined through the O-shaped imaging gantry 122, and a portion of the patient P requiring surgical intervention (e.g., the cranium) may be accessed from the second (e.g., rear) side of the O-shaped imaging gantry 122.

In some versions, the carriage 170 and the robotic arm 156 attached thereto may be moved to different positions along the length of support element 158 (e.g., any arbitrary position between a first end 176 and a second end 178 of the support element 158). The carriage 170 and the robotic arm 156 may be fixed in place at a particular desired position along the length of the support element 158. In some versions, the carriage 170 may be moved manually (e.g., positioned by an operator at a particular location along the length of the support element 158 and then clamped or otherwise fastened in place). Alternately, the carriage 170 may be driven to different positions using a suitable drive mechanism (e.g., a motorized belt drive, friction wheel, gear tooth assembly, cable-pulley system, etc., not shown in detail). The drive mechanism may be located on the carriage 170 and/or the support element 158, for example. An encoder mechanism may be utilized to indicate the position of the carriage 170 and the base end 160 of the robotic arm 156 on the support element 158. Although the version of FIG. 1 illustrates one robotic arm 156 mounted to the support element 158, it will be understood that more than one robotic arm 156 may be mounted to the support element 158 via respective carriages 170.

In some versions, the robotic arm 156 may be mounted directly to the support element 158, such as on a mounting surface 172 that is integrally formed on the support element 158. In such an version, the position of robotic arm 156 may not be movable along the length of the support element 158. In other versions, the robotic arm 156 may be secured to any other portion of the imaging system 104, such as directly mounted to the gantry 122. Alternatively, the robotic arm 156 may be mounted to the patient support 116 or column 118, to any of the wall, ceiling or floor in the operating room, or to a separate cart as noted above. In some versions, the robotic arm 156 may be mounted to a separate mobile shuttle, similar to as is described in U.S. Pat. No. 11,103,990, entitled "System and Method for Mounting a Robotic Arm in a Surgical Robotic System," the disclosure of which is hereby incorporated by reference in its entirety. Although a single robotic arm 156 is shown in FIG. 1, it will be understood that two or more robotic arms 156 may be utilized.

Those having ordinary skill in the art will appreciate that the robotic arm 156 can be employed to aid in the performance of various types of surgical procedures, such as a minimally-invasive spinal surgical procedure or various other types of orthopedic, neurological, cardiothoracic and general surgical procedures. In the version of FIGS. 1 and 2, the robotic arm 156 may be used to assist a surgeon performing a surgical procedure in the lumbar spinal region of a patient. The robotic arm 156 may also be used for thoracic and/or cervical spinal procedures. The procedures may be performed posteriorly, anteriorly or laterally. Other configurations are contemplated.

In some versions, the robotic arm 156 may be controlled to move the end effector 164 to one or more pre-determined positions and/or orientations with respect to a patient P, such as to and/or along a trajectory defined relative to the anatomy of the patient P. As discussed above, the end effector 164 may be realized as or may otherwise support various types of instruments and/or tools 106 including, but not limited to, a needle, a cannula, a dilator, a cutting or gripping instrument, a scalpel, a drill, a screw, a screwdriver, an electrode, an endoscope, an implant, a radiation source, a drug, etc., that may be inserted into the body of the patient P. In some versions, the end effector 164 may be realized as a hollow tube or cannula configured to receive a surgical tool 106, including without limitation a needle, a cannula, a dilator, a cutting or gripping instrument, a scalpel, a drill, a screw, a screwdriver, an electrode, an endoscope, an implant, a radiation source, a drug, and the like. The surgical tool 106 may be inserted into or otherwise adjacent to the patient's body through the hollow tube or cannula by a surgeon. The robotic arm 156 may be controlled to maintain the position and orientation of the end effector 164 with respect to the patient P to ensure that the surgical tool(s) 106 follow a desired trajectory through the patient's body to reach the target site ST. The target site ST may be determined preoperatively and/or intraoperatively, such as during a surgical planning process, based on patient images which may be obtained using the imaging system 104.

In the representative version illustrated herein, the navigation system 102 tracks the robotic arm 156 within the localizer coordinate system LCLZ via the robot tracker 132R, as is described in greater detail below. To this end, a control loop may continuously read the tracking data and current parameters (e.g., joint parameters) of the robotic arm 156, and may send instructions to the navigation controller 128 and/or to the imaging system controller 114 (and/or some other controller, such as a robot controller) to cause the robotic arm 156 to move to a desired position and orientation within the localizer coordinate system LCLZ.

In some versions, a surgeon may use one or more portions of the surgical system 100 as a planning tool for a surgical procedure, such as by setting trajectories within the patient for inserting tools 106, as well as by selecting one or more target sites ST for a surgical intervention within the patient's body. The trajectories and/or target sites ST set by the surgeon may be saved (e.g., in a memory of a computer device) for later use during surgery. In some versions, the surgeon may be able to select stored trajectories and/or target sites ST using the surgical system 100, and the robotic arm 156 may be controlled to perform a particular movement based on the selected trajectory and/or target site ST. For example, the robotic arm 156 may be moved to position the end effector 164 of the robotic arm 156 into alignment with the pre-defined trajectory and/or over the pre-determined target site ST. As discussed above, the end effector 164 may include the tool guide 166 which may be used to guide the tool 106 relative to the patient's body along the pre-defined trajectory and/or to the pre-defined target site ST.

As discussed above, the localizer 130 may include a camera unit 148 with one or more optical position sensors 150. More specifically, the optical position sensors 150 may be light sensors capable of sensing changes in infrared (IR) emitted within a field of view. In some versions, the localizer 130 may include one or more radiation sources (e.g., one or more diode rings) that direct radiation (e.g., IR radiation) into the surgical field, where the radiation may be reflected by the markers 152 and received by the cameras. In the illustrated version, certain active markers 152 (e.g., active markers 152 which define the robot tracker 132R) are configured to emit IR light detectable by the optical position sensors 150 of the localizer 130. The navigation controller 128 may be coupled to the localizer 130 and may determine the positions and/or orientations of markers 152 detected by the optical position sensors 150 using, for example, triangulation and/or transformation techniques. A 3D model and/or mathematical simulation of the surgical space may be generated and continually updated using motion tracking software implemented by the navigation controller 128.

As discussed above, the patient tracker 132A may be rigidly attached to a portion of the patient's anatomy in the anatomical region of interest adjacent to the target site ST (e.g., clamped or otherwise attached to the ilium, to the spinous process of the vertebrae, and the like) to enable the anatomical region of interest to be continually tracked by the navigation system 102. In the illustrated version, the robot tracker 132R includes an end effector tracker 182 that is rigidly attached to the end effector 164 of the robotic arm 156 to enable the robotic arm 156 to be tracked using the navigation system 102. Using the pose of the end effector tracker 182 (as well as of the patient tracker 132) monitored within the localizer coordinate system LCLZ by the localizer 130, the navigation controller 128 and/or some other controller (e.g., a robot controller) may include software configured to perform transformations between joint coordinates of the robotic arm 156 and the localizer coordinate system LCLZ which, in turned, may be utilized by the robotic arm 156 to control or otherwise adjust the position and/or orientation of the end effector 164 with respect to the patient P. In some versions, the robotic arm 156 may include multiple robot trackers 132R and/or robot trackers 132R other than the end effector tracker 182 (e.g., on joints of the arm). Other configurations are contemplated.

Figure 8A:
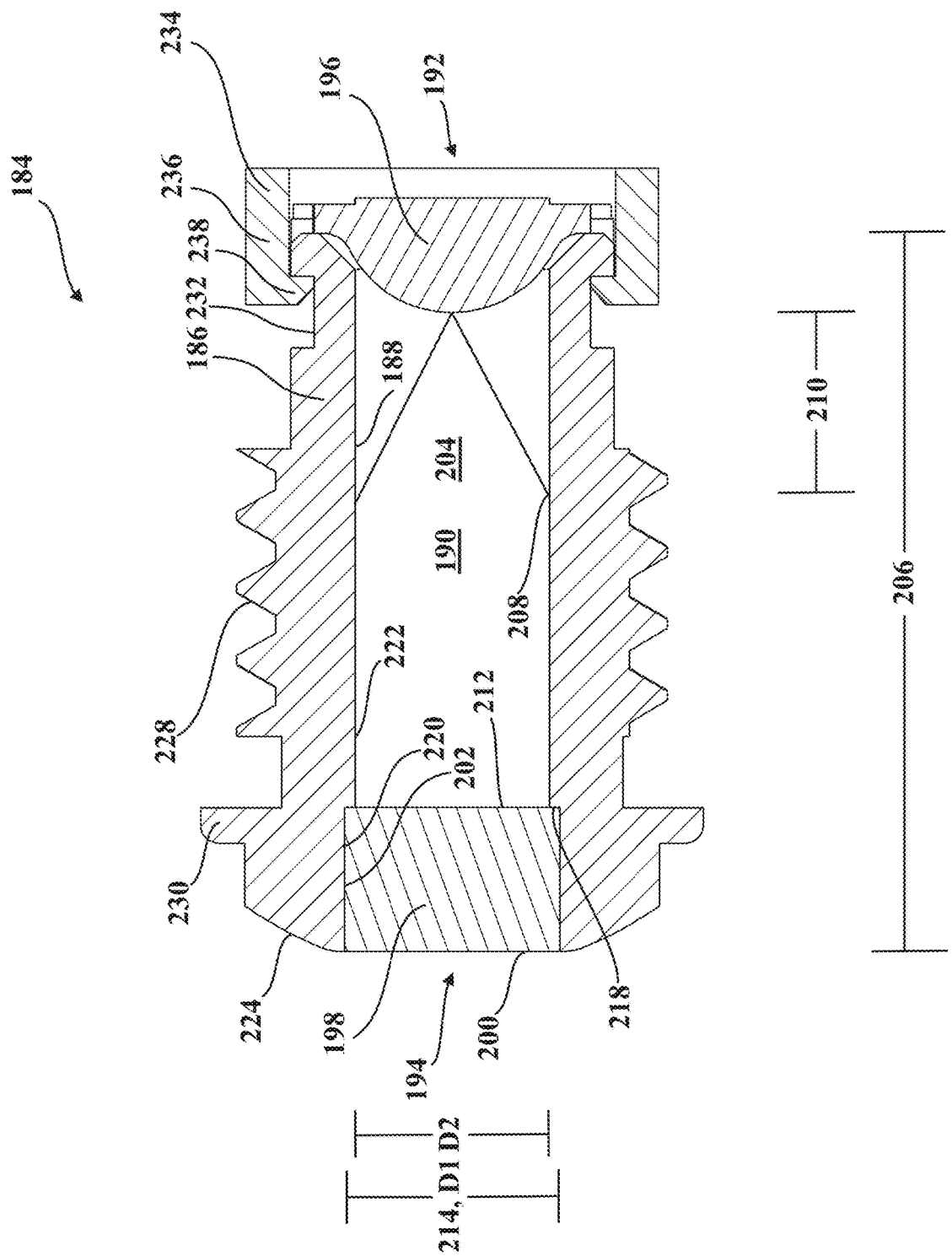
FIG. 8A is a cross-section view of the marker of FIG. 7A, with the marker including a light module arranged to emit light through a conical zone at a first angle into reflection with the inner bore surface, and a diffuser having an output surface to present diffused light detectable by the localizer.
Figure 8B:
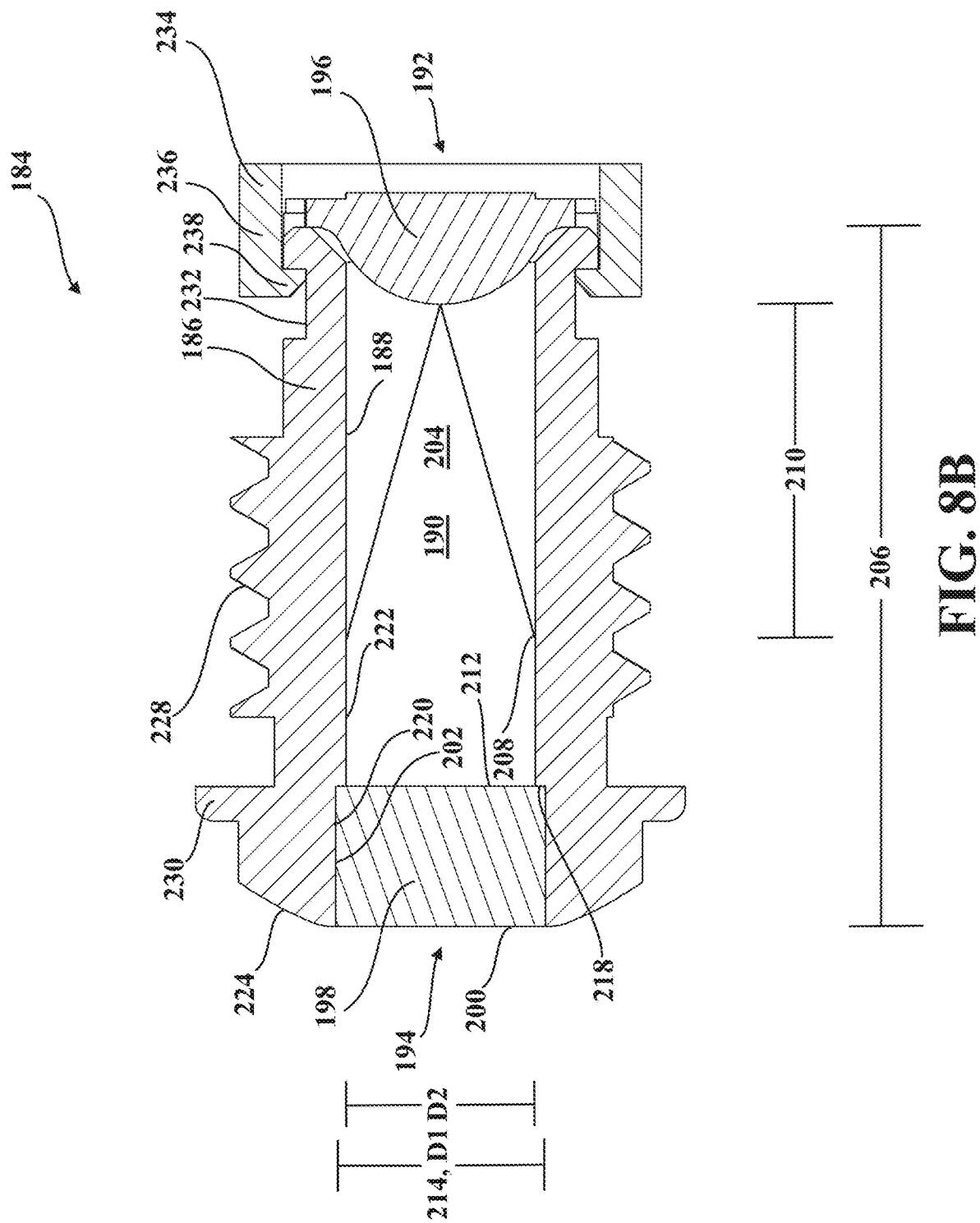
FIG. 8B is a cross-section view of the marker of FIG. 7A, with the light module arranged to emit light through the conical zone extending at a second angle into reflection with the inner bore surface.
Figure 8C:
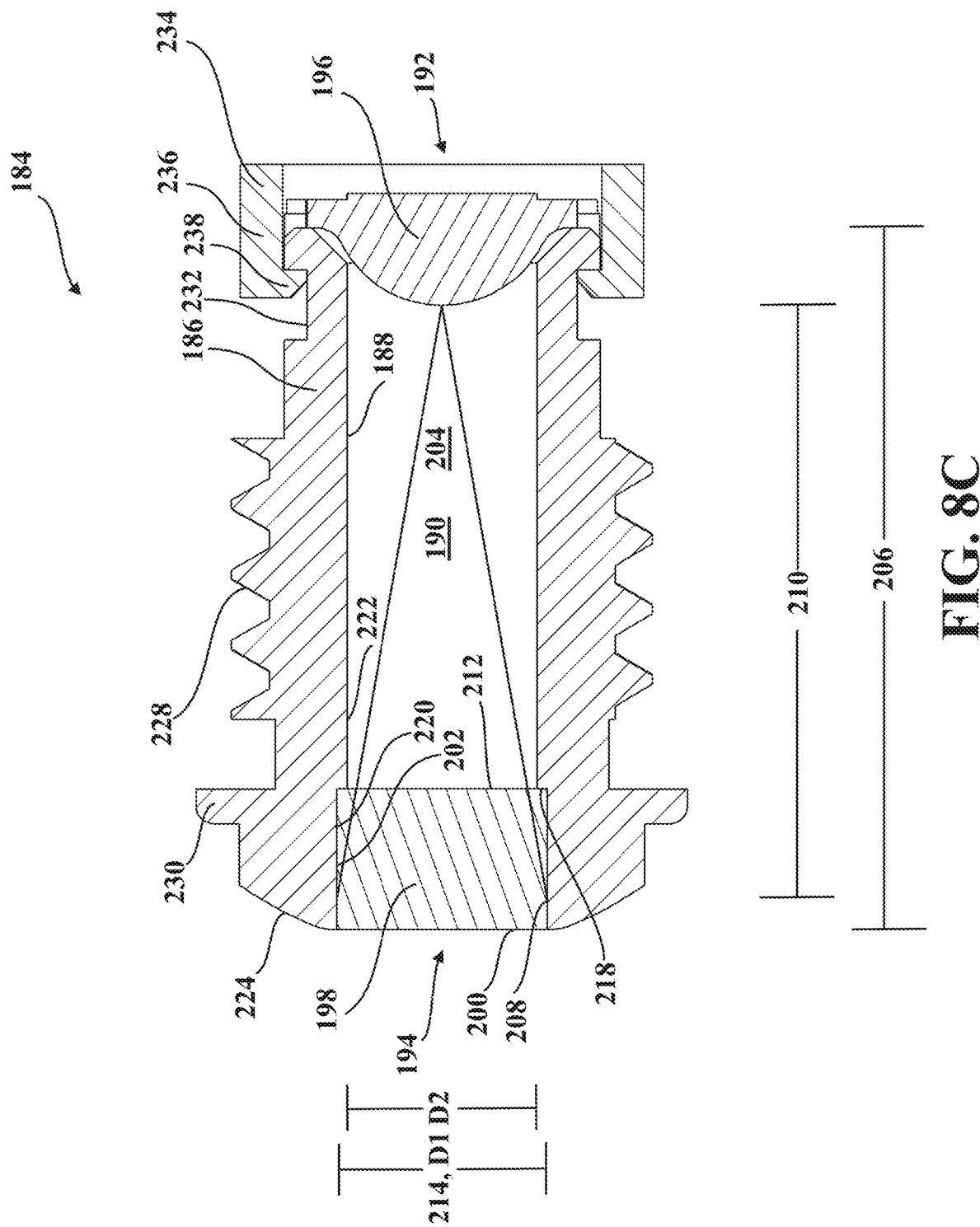
FIG. 8C is a cross-section view of the marker of FIG. 7A, with the light module arranged to emit light through the conical zone extending at a third angle into reflection with the inner bore surface.

In the illustrated version, the end effector tracker 182 of the end effector 164 includes a plurality of markers 184. Each marker 184 of the end effector tracker 182 includes a body 186 having an inner bore surface 188 defining a bore 190 extending between an inlet 192 and an outlet 194 (see: FIGS. 8A-8C). Each marker 184 also includes a respective light module 196 supported adjacent to the inlet 192 and arranged to emit light into reflection with the inner bore surface 188. Each marker 184 further includes a diffuser 198 supported adjacent to the outlet 194 to diffuse light reflected by the inner bore surface 188 emitted by the light module 196. The diffuser 198 has an output surface 200 arranged to present diffused light across the output surface 200 detectable by the localizer 130 of the navigation system 102 to enable tracking states of the end effector 164. Each of the components of the markers 184 of the end effector tracker 182 introduced above will be described in greater detail below.

The markers 184 of the end effector tracker 182 described herein are configured such that diffused light presented across the output surface 200 of the diffuser 198 can be viewed by the localizer 130 with a consistent and substantially uniform intensity, from various angles and perspectives, including when viewed directly on. Those having ordinary skill in the art will appreciate that the consistent intensity of diffused light afforded by the markers 184 of the end effector tracker 182 of the present disclosure provides significant advantages to improved tracking accuracy and reliability by preventing the localizer 130 from being washed out from light emitted by markers with inconsistently bright intensity (which, thus, would otherwise complicate accurate monitoring of other markers). Thus, the localizer 130 is able to reliably detect light emitted from each of the markers 184 of the end effector tracker 182 that are visible within its field of view, as well as from other trackers 132 (e.g., the patient tracker 132A) that are visible within its field of view, with a high level of accuracy irrespective of movement of markers 184 that could otherwise wash-out the localizer 130. Accordingly, the navigation system 102 can accurately monitor for relative movement between the patient and the robotic arm 156 during the surgical procedure which, in turn, also allows the robotic arm 156 and other portions of the surgical system 100 to react to movement of tracked objects.

Furthermore, it will be appreciated that the end effector tracker 182 of the present disclosure helps ensure that the localizer 130 can accurately locate the marker 184 irrespective of its orientation. More specifically, the uniformity and consistency of the light presented across the output surface 200 helps prevent "chip shift" navigation accuracy issues that could otherwise occur when viewing light emitting diodes which emit light that varies in intensity depending on the orientation it is viewed from, and/or which are not precisely manufactured to emit light from a central point and/or along a central axis that is aligned with its structure in a desired number of degrees of freedom (e.g., a point at a centroid, a cone aligned about an axis, and the like). Here too, it will be appreciated that the consistent intensity of diffused light presented across the output surface 200 allows the shape and/or profile of the output surface 200 to be known and readily recognized, even where the output surface 200 is arranged at angles relative to the field of view of the localizer 130 that would otherwise complicate recognizing a known or otherwise expected shape and/or profile. In this way, potential tracking issues resulting from optical distortions present when directly monitoring certain types of light emitting diodes, can be significantly minimized. Here too, utilization of the diffuser 198 also helps prevent tracking issues that could otherwise occur based on manufacturing variations or differences between different light modules 196, such as for example differences in emission intensity, differences between geometry and light output direction and area through which light is emitted, and the like. It will be appreciated that this affords significant advantages related to cost and availability of light modules 196 while, at the same time, ensuring that the markers 184 within the field of view of the localizer 130 are readily detectable by the localizer 130 when viewed from various angles, orientations, and the like, even where less expensive and/or precisely manufactured light emitting diodes are utilized.

In some versions, the inner bore surface 188 of the body 186 of the marker 184 may have or otherwise define a bore parameter value PVB, and the output surface 200 of the diffuser 198 may have or otherwise define a diffuser parameter value PVD different from the bore parameter value PVB. The bore parameter value PVB and the diffuser parameter value PVD may represent or otherwise be defined as, for example, one or more parameters associated with transmission rate of light, reflectivity, diffusivity, opacity, transparency, and the like. Moreover, it is to be appreciated that the different values of the diffuser parameter value PVD and the bore parameter value PVB may result for different materials of construction or different methods of manufacture.

In some versions, the inner bore surface 188 of the body 186 may be reflective to light. More specifically, the inner bore surface 188 of the body 186 may be configured to reflect visible light and/or infrared (IR) light. In some versions, the inner bore surface 188 may be specular (e.g., mirrored) to reflect as much light as possible. It will be appreciated that the inner bore surface 188 of the body 186 could be configured so as to be reflective to light in a number of different ways, such as for example by polishing, burnishing, surface finishing (e.g., by impact with glass beads), and/or via one or more types of coating, plating, and the like. Other configurations are contemplated. In some versions, the inner bore surface 188 may be configured so as to have high reflectivity by being provided with a surface finish of about 1 micron to about 100 microns. More specifically, the inner bore surface 188 may comprise a surface finish of about 1 micron to about 50 microns, about 1 micron to about 20 microns, about 1 micron to about 10 microns, about 1 micron to about 5 microns, about 1 micron to about 4 microns, about 1 micron to about 3 microns, and about 2 microns. It is to be appreciated that the inner bore surface 188 may also have a surface finish of less than 1 micron in some versions. Other configurations are contemplated. In some versions, portions of the body 186 of the marker 184 may be opaque.

In some versions, the inner bore surface 188 or other portions of the body 186 may comprise metal such as aluminum, gold, steel, chrome, copper, nickel, brass, bronze, zinc, silver, lead, tin, titanium, and alloys thereof. The inner bore surface 188 may comprise of the same or different material of construction as compared to the remainder of the body 186 of the marker 184. In other words, the inner bore surface 188 may have a plating, coating, or paint of a different material of construction as compared to the remainder of the body 186. The remainder of the body 186 may comprise metal such as, but not limited to, aluminum, gold, steel, chrome, copper, nickel, brass, bronze, zinc, silver, lead, tin, titanium, or alloys thereof. In some versions, the inner bore surface 188 comprise a plating of gold and the remainder of the body 186 may comprise aluminum. Other configurations are contemplated.

The diffuser 198 is at least partially translucent, and may have a transmission rate of about 5% to about 95% (e.g., transmitting light emitted from the light module 196 reflected along the inner bore surface 188). More specifically, the diffuser 198 may have a transmission rate of about 10% to about 90%, about 20% to about 80%, about 25% to about 70%, about 30% to about 60%, about 35% to about 55%, about 40% to about 50%, and about 45%. The intensity of the diffused light may be configured to be approximately uniform across the output surface 200 the diffuser 198 to prevent hot-spots of intensity of light, thereby preventing wash-out of the localizer 130 as noted above.

In some versions, the diffuser 198 may comprise a polymeric material such as one or more types of acrylic (e.g., polyacrylates, acrylic resins, PMMA, and the like), polycarbonate, and polyalkylenes (e.g., polyethylene). In some versions, the diffuser 198 may also be white in color. In some versions, the diffuser 198 may have a circumferential surface 202 which has been darkened, for example blackened, to limit stray reflections or aberrations. The circumferential surface 202 of the diffuser 198 may be darkened and/or blackened through use of a paint, a coating, or an adhesive, and the like.

The light module 196 may be configured to emit visible light and/or infrared light as noted above. In some versions, the light module 196 may be realized as a light emitting diode. The light emitting diode may have an anode, a cathode, anvil posts, a die such as a semiconductor die, a reflective cavity, wire bond, a case (e.g., comprising silicone or epoxy), and the like (not shown in detail). However, other configurations of the light module 196 are contemplated.

Figure 7A:
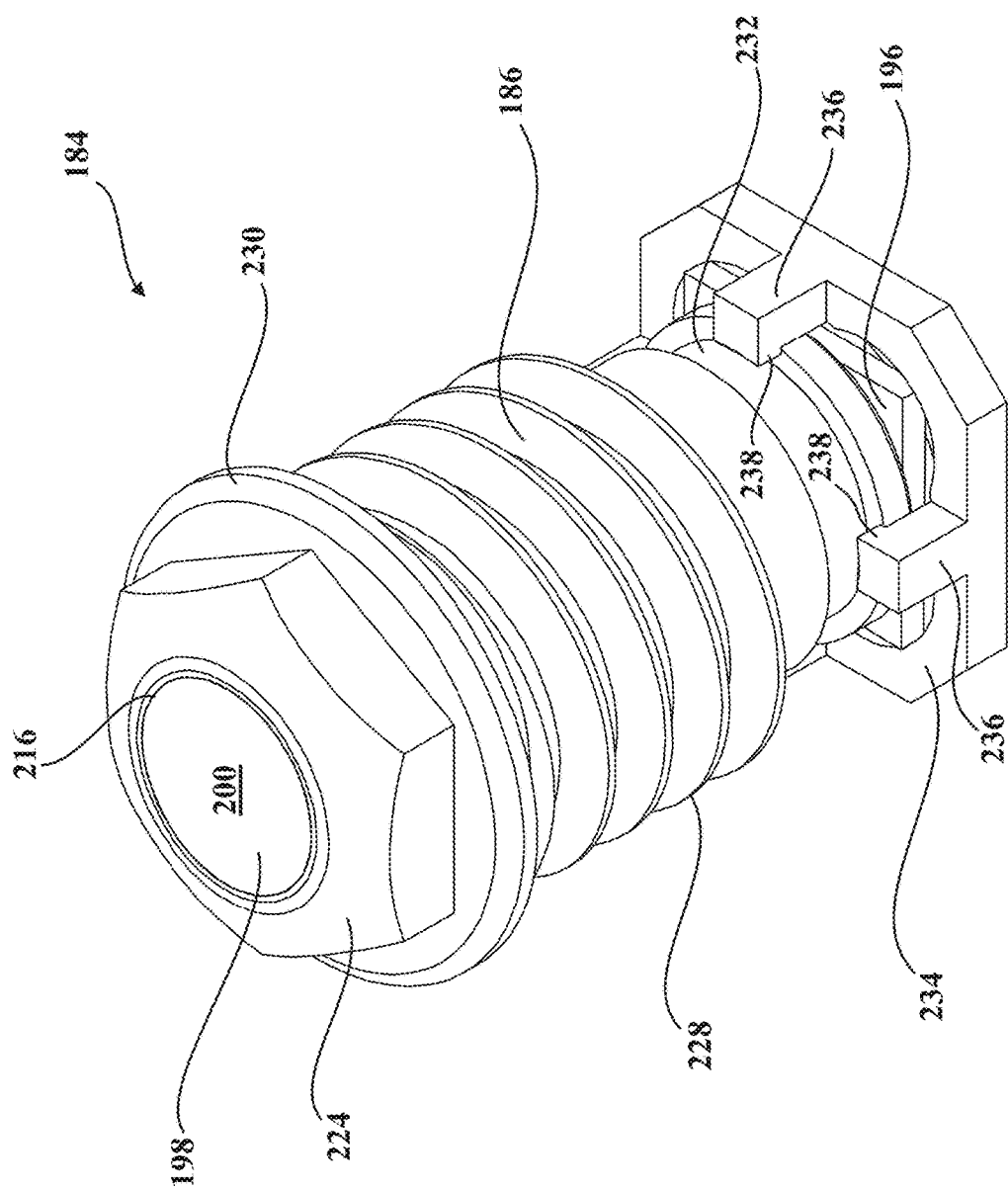
FIG. 7A is a perspective view of one of the plurality of markers, with the body of the marker having a threaded outer surface.
Figure 7C:
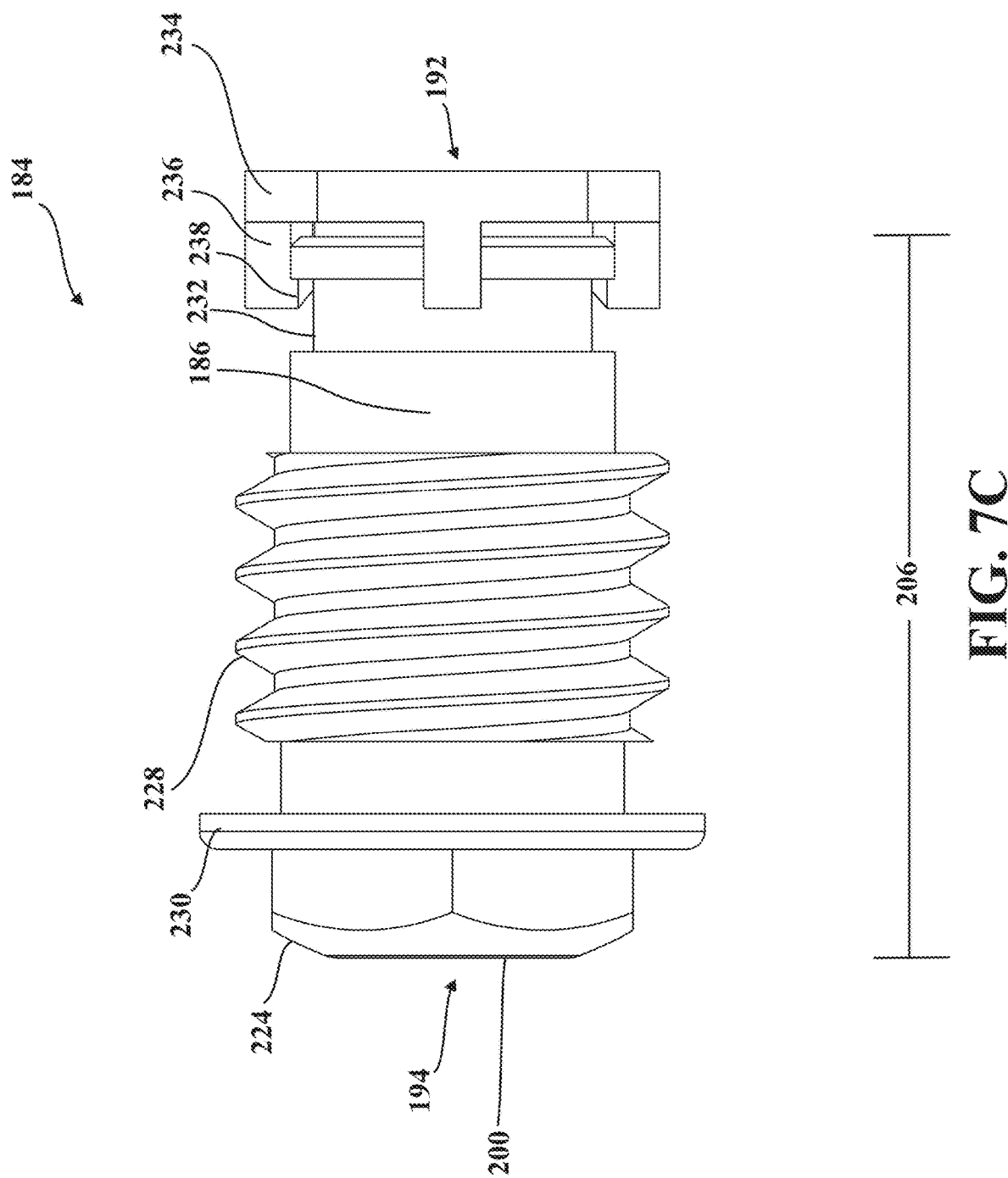
FIG. 7C is a side view of the marker of FIG. 7A.

As shown in FIGS. 8A-8C, the light module 196 may be arranged to emit light through differently configured conical zones 204 extending from the light module 196, into the bore 190, and towards the diffuser 198. In some versions, the conical zone 204 generally represents a volume in which emitted light is concentrated, but it will be appreciated that the conical zone 204 could be defined in other ways, and may be different for certain light modules 196. As shown in FIG. 8A, the marker 184 includes the light module 196 arranged to emit light through the conical zone 204 at a first angle A1 into reflection with the inner bore surface 188. As shown in FIG. 7B, the marker 184 includes the light module 196 arranged to emit light through the conical zone 204 at a second angle A2 different from the first angle A1 and into reflection with the inner bore surface 188. As shown in FIG. 8C, the marker 184 includes the light module 196 arranged to emit light through the conical zone 204 at a third angle A3 different from the first angle and the second angle and into reflection with the inner bore surface 188. In each of the versions shown in FIGS. 8A-8C, light is emitted by the light modules 196 into the bore 190 towards the diffuser 198, and exits the diffuser 198 uniformly at the output surface 200.

With continued reference to FIGS. 8A-8C, the body 186 defines an axial body length 206 between the inlet 192 and the outlet 194. In the versions shown in FIGS. 8A-8B, the conical zones 204 intersects the inner bore surface 188 at an intersection location 208. The intersection location is an axial location relative to a longitudinal axis of the bore 190. It is to be appreciated that, because the conical zone 204 is a three-dimensional volume, the conical zone 204 may intersect the inner bore surface 188 at many locations depending, for example, on the configuration of the light module 196. Here too, it will be appreciated that, in some versions, the conical zone 204 may be configured to at least partially intersect the diffuser 198 (e.g., where the conical zone 204 does not necessarily intersect the inner bore surface 188). The intersection location 208 is the location where the most proximal portion of the conical zone 204 relative to the light module 196 intersects the inner bore surface 188 (see FIGS. 8A-8B) or, in some versions, where the conical zone 204 would otherwise intersect another portion of the body 186 adjacent to the diffuser 198 (see FIG. 8C). Moreover, the conical zone 204 defines an axial zone length 210 between the light module 196 and the intersection location 208. The axial body length 206 may be larger than the axial zone length 210, as shown in FIGS. 8A-8C.

The diffuser 198 has an input surface 212 facing away from the output surface 200 and arranged to receive light reflected by the inner bore surface 188 emitted by the light module 196. In some versions, the input surface 212 is arranged in spaced relation to the intersection location 208 where the conical zone 204 intersects the inner bore surface 188, as shown in FIGS. 8A-8B. In other words, the intersection location 208 may be disposed between the light module 196 and the input surface 212. Further, the output surface 200 of the diffuser 198 defines a radial width 214. In some versions, the axial body length 206 of the body 186 may be larger than the radial width 214 of the diffuser 198. The input surface 212 being arranged in spaced relation to the intersection location 208, as well as the axial body length 206 of the body 186 being larger than the radial width 214 of the diffuser 198, can help further reduce the presence of hot spots of high light intensity emitted from the light module 196 that would otherwise be visible to the localizer 130.

The axial body length 206 of the body 186 may be between 1.1 and 20 times greater than the radial width 214 of the diffuser 198. More specifically, the axial body length 206 of the body 186 may be between 2 and 15 times greater than the radial width 214 of the diffuser 198, the axial body length 206 of the body 186 may be between 3 and 12 times greater than the radial width 214 of the diffuser 198, the axial body length 206 of the body 186 may be between about 5 and 10 times greater than the radial width 214 of the diffuser 198, and the axial body length 206 of the body 186 may be between about 6 and 8 times greater than the radial width 214 of the diffuser 198. However, it is also to be appreciated that the axial body length 206 of the body 186 may be less than the radial width 214 of the diffuser 198, or the axial body length 206 of the body 186 may even be more than 20 times greater than the radial width 214 of the diffuser 198. Other configurations are contemplated.

The radial width 214 of the diffuser 198 may be between about 1 millimeter and about 8 millimeters. More specifically, the radial width 214 of the diffuser 198 may be between about 1 millimeter and about 5 millimeters, the radial width 214 of the diffuser 198 may be between about 2 millimeters and about 4 millimeters, and the radial width 214 of the diffuser 198 may be about 3 millimeters. It is to be appreciated that the radial width 214 of the diffuser 198 may be relatively small as compared to a typical marker, which is typically at least 10 millimeters. Here, a relatively small radial width 214 of the diffuser 198 may assist preventing the marker 184 from being partially occluded by an object between the marker 184 and the localizer 130, thus ensuring that the localizer 130 is able to detect the true position of the marker 184 and thus also ensuring the navigation system 102 accurately monitors and responds to movement during the surgical procedure. In some versions, the diffuser 198 may be manufactured through use of an external punch to ensure a consistent radial width 214 of the diffuser 198 and prevent flashing from extending from the diffuser 198. Other configurations are contemplated.

Figure 6:
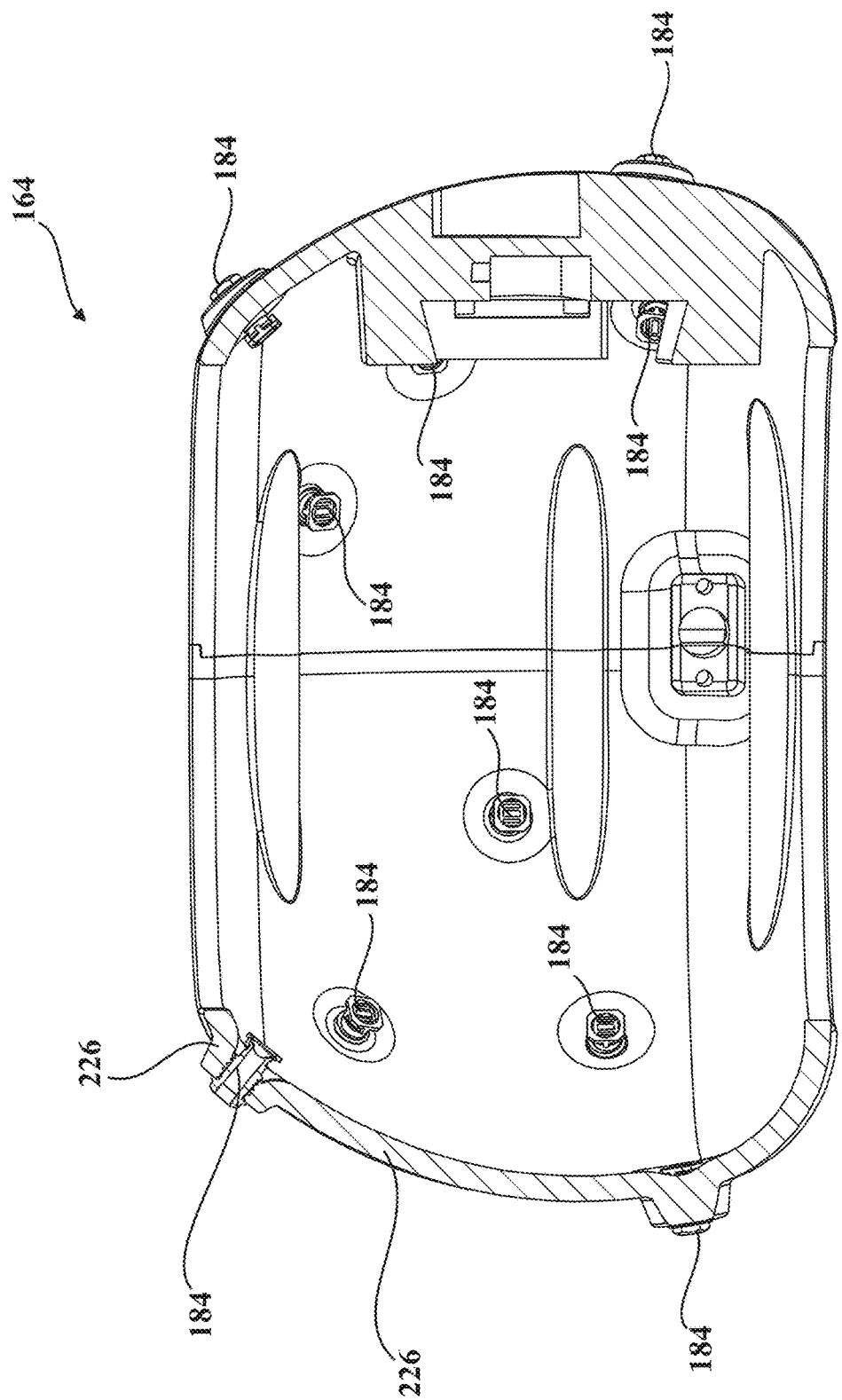
FIG. 6 is a cross-section view of the end effector of FIG. 5B, with the plurality of markers having a body having an inner bore surface defining a bore extending between an inlet and an outlet, and a flange arranged adjacent to the outlet of the bore and shaped for engagement with the end effector housing.

As shown in FIGS. 6A-6B, the output surface 200 may have a circular profile 216. However, the output surface 200 may have a polygonal profile such as a triangular, rectangular, pentagonal, hexagonal, heptagonal, or octagonal profile, among other possibilities. Moreover, the output surface 200 may have a rounded profile such as oval. As noted above, the profile of the output surface 200 may be determined by the shape of the external punch, and may be configured so as to be recognized by the localizer 130 or other components of the surgical system 100.

In some versions, the light module 196 may be disposed at least partially in the bore 190, as shown in FIGS. 8A-8C. Moreover, a majority of the light module 196 may be disposed in the bore 190, or the light module 196 may be disposed completely in the bore 190, to seat and prevent damage to the light module 196. However, the light module 196 may be disposed outside of the bore 190 and still positioned to emit light through the bore 190. Additionally, the diffuser 198 may be disposed at least partially in the bore 190, as shown in FIGS. 8A-8C. Moreover, a majority of the diffuser 198 may be disposed in the bore 190, or the diffuser 198 may be disposed completely in the bore 190. However, the diffuser 198 may be disposed outside of the bore 190 and still positioned such that light emitted from the light module 196 and through the bore 190 is nonetheless diffused by the diffuser 198.

In some versions, portions of the surgical system 100 may also configured to covered by a drape (not shown), disposed such as about the end effector 164 and the robotic arm 156. The drape may be translucent to diffused light so that the localizer 130 is able to detect the markers 184 through the drape. The drape may also be sterile, or sterilizable, to limit the possibility of infection to the patient. Here, it will be appreciated that because the diffuser 198 can be configured so as to not protrude from the bore 190, which may assist in preventing the drape from being torn, and thus also limiting the possibility of infection to the patient.

The diffuser 198 may be mechanically fastened to the body 186. In some versions, the diffuser 198 is press-fit into the bore 190 of the body 186. Alternatively or additionally, the diffuser 198 may be bonded or otherwise adhered to the body 186. The circumferential surface 202 of the diffuser 198 may have a taper to facilitate the diffuser 198 being press-fit into the bore 190 of the body 186, and the inner bore surface 188 may be provided with a complementary taper which corresponds to the taper of the circumferential surface 202 of the diffuser 198. As shown in FIGS. 8A-8C, the inner bore surface 188 of the body 186 may include a radially extending surface 218 separating the inner bore surface 188 into a first portion 220 having a first diameter D1 and a second portion 222 having a second diameter D2 less than the first diameter D1. The first diameter D1 may increase from the radially extending surface 218 toward the outlet 194 of the bore 190 in implementations with the taper of the inner bore surface 188. The diffuser 198 may be disposed proximate to the first portion 220 of the inner bore surface 188. This configuration can help prevent the diffuser 198 from moving toward the light module 196, thus further positionally fixing the diffuser 198 and increasing the accuracy of the localizer 130.

The radially extending surface 218 may also be positioned to result in the output surface 200 of the diffuser 198 being flush with the outlet 194 of the bore 190, as shown in FIGS. 8A-8C. In some versions, output surface 200 of the diffuser 198 being flush with or otherwise adjacent to the outlet 194 of the bore 190 further increases the accuracy of the navigation system 102 by ensuring the output surface 200 is visible as a two-dimensional object with a known shape and/or profile. In some versions, a distal end 224 of the body 186 adjacent to the outlet 194 of the bore 190 may be dulled, such as by anodizing, to prevent stray reflections and aberrations adjacent to the output surface 200. The first portion 220 of the inner bore surface 188 may also be dulled, in a non-limiting example by anodizing, to prevent stray reflections and aberrations. Other configurations are contemplated.

Figure 5A:
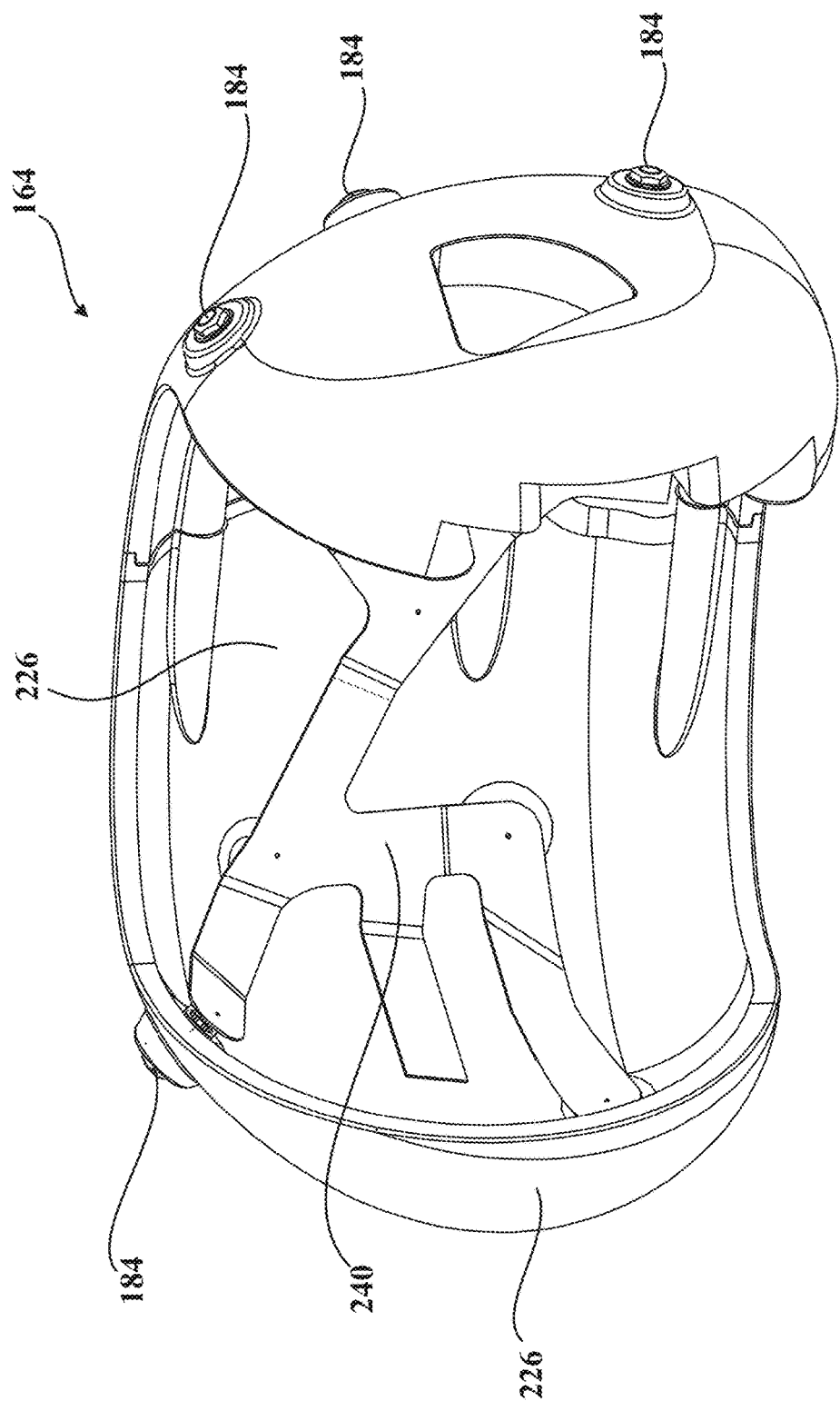
FIG. 5A is a perspective view of the end effector of FIG. 4A, with the end effector having a flex circuit coupled to the plurality of markers to maintain relative positions of the plurality of markers.
Figure 5B:
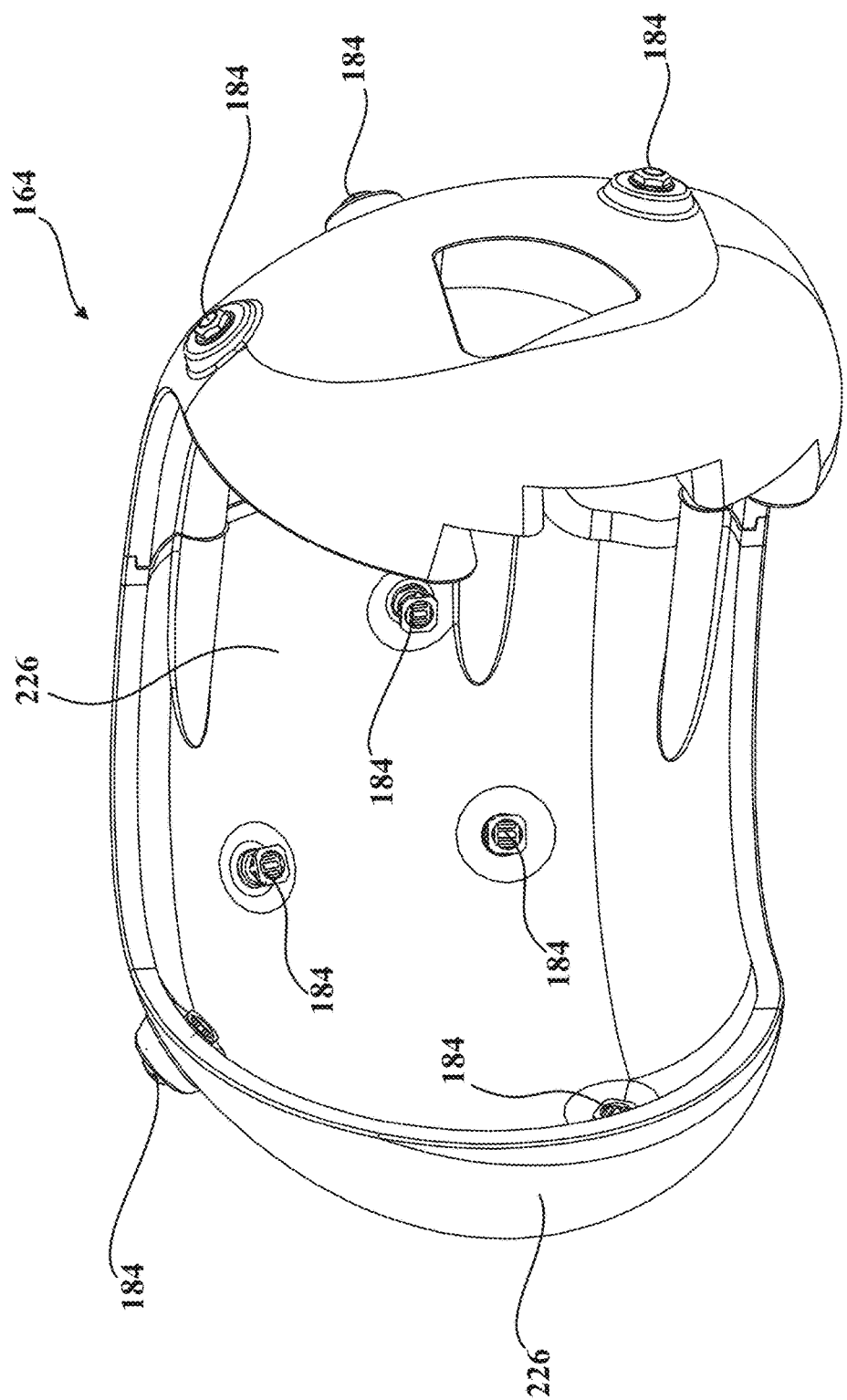
FIG. 5B is a perspective view of the end effector of FIG. 4A, with plurality of markers extending through an end effector housing of the end effector.

The end effector tracker 182 may include an end effector housing 226, and the plurality of markers 184 may each be operatively attached to the end effector housing 226, as shown in FIG. 5. The plurality of markers 184 may be spaced in a predetermined fashion (e.g., asymmetrically in various directions) about the end effector housing 226 so as to be viewable to the localizer 130 in a manner where the localizer 130 is prevented from mistaking which side of the end effector housing 226 the localizer 130 is viewing. Each of the plurality of markers 184 may be mechanically fastened to the end effector housing 226. In some versions, each of the markers 184 may include threading 228 to thread the markers 184 into the end effector housing 226, or each of the markers 184 may be press-fit into the end effector housing 226. The distal end 224 of the body 186 may also include a hex or other shape engageable by a tool such as a socket or a wrench to assist in threading the marker 184 into the end effector housing 226. The body 186 may include a flange 230 arranged adjacent to the outlet 194 of the bore 190. The flange 230 may be shaped for engagement with the end effector housing 226. In other words, the flange 230 may be contactable with the end effector housing 226. The flange 230 may have a chamfer and may also be dulled. Other configurations are contemplated.

Figure 4A:
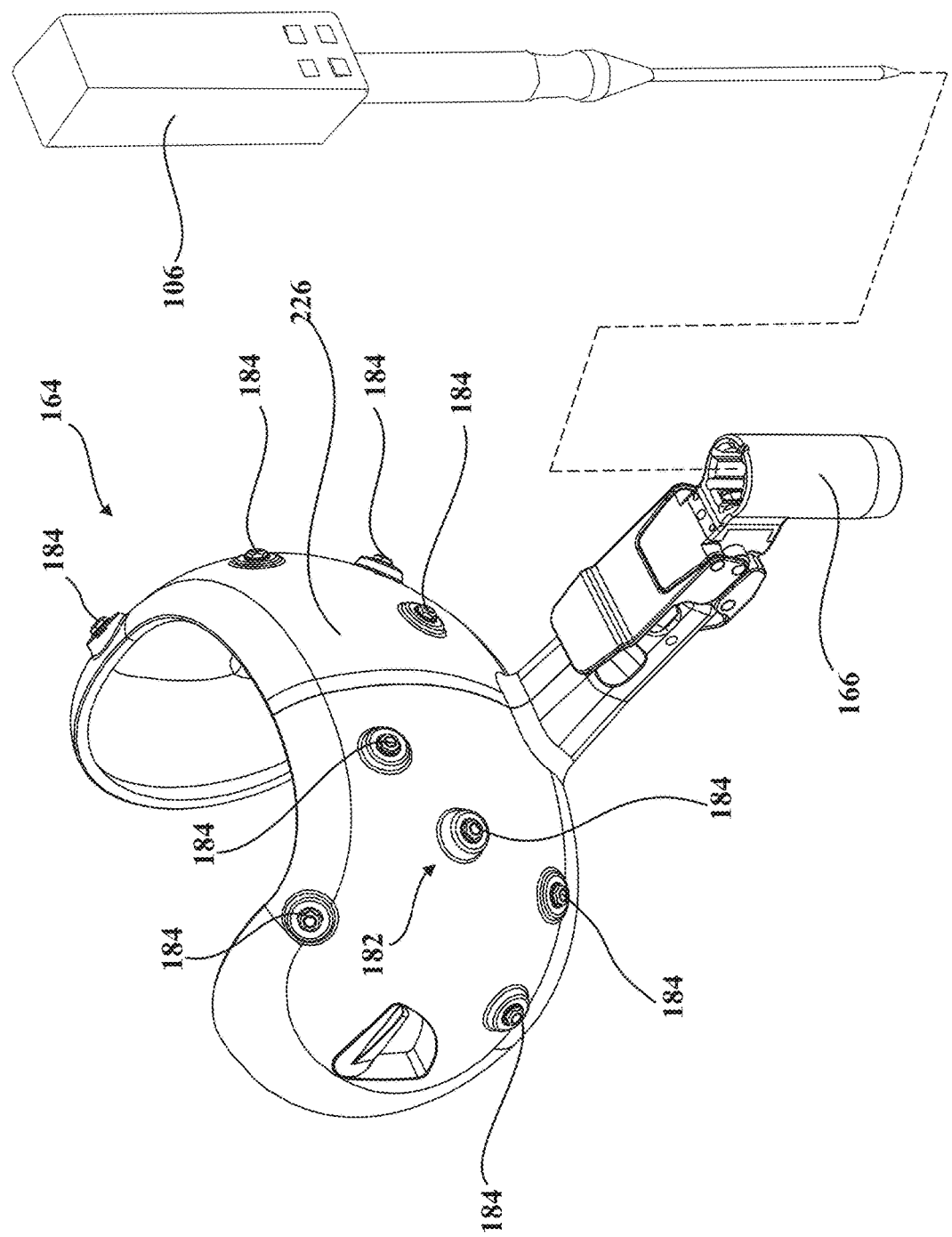
FIG. 4A is a perspective view of the end effector of FIGS. 1 and 3, with the end effector configured to support a tool and having an end effector tracker having a plurality of markers.
Figure 4B:
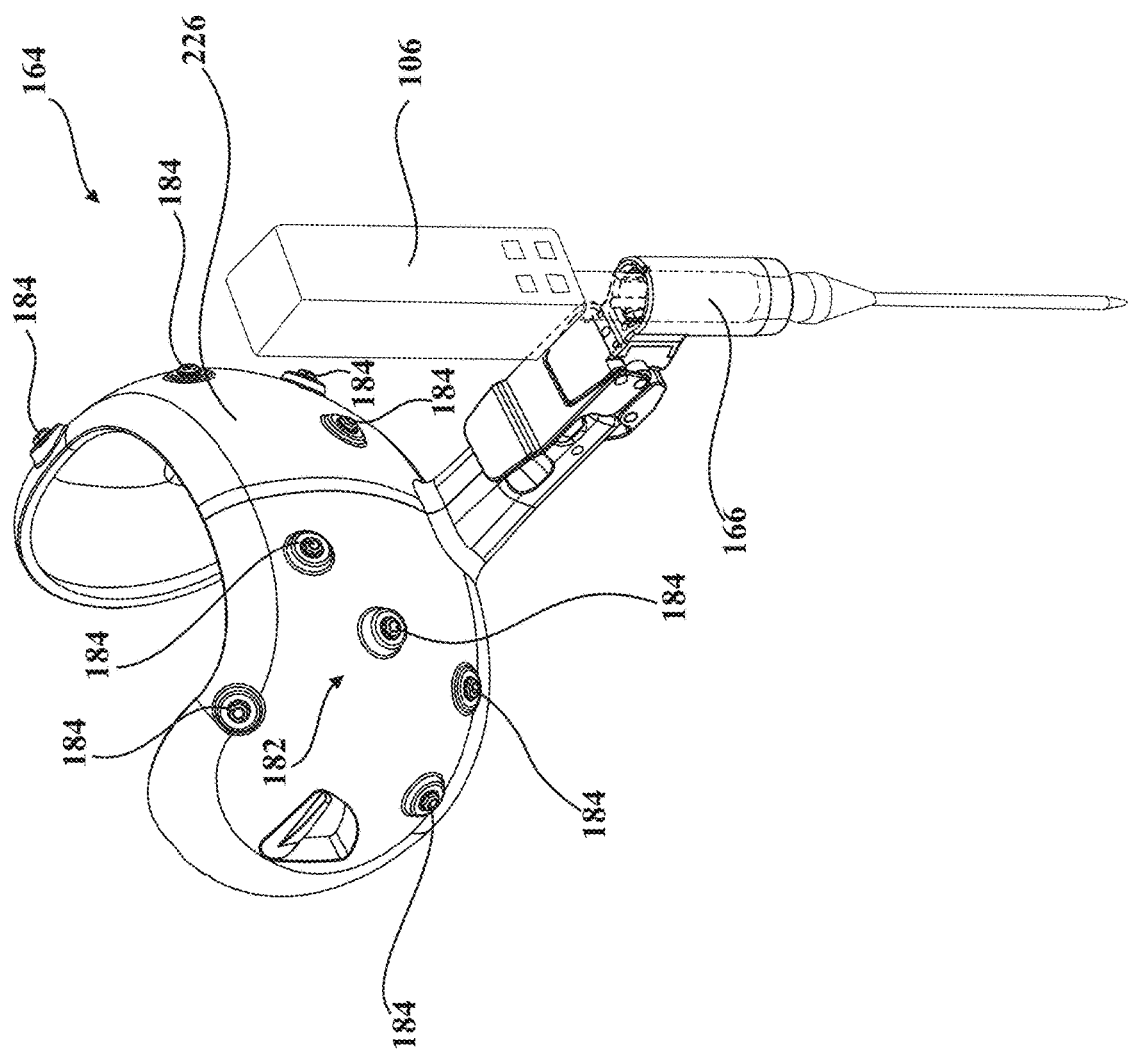
FIG. 4B is another perspective view of the end effector and the tool of FIG. 4A, shown with the end effector supporting the tool.

The body 186 may further include a retainer 232 arranged adjacent to the inlet 192 of the bore 190. The retainer 232 may be realized as a groove, an indentation or other void, or other structural feature defined in or by the body 186. As shown in FIGS. 7A-8C, each of the plurality of markers 184 may further include a clip 234 supporting the light module 196 and coupled to the retainer 232 to secure the light module 196 to the body 186. The clip 234 may include a resilient arm 236 shaped to engage the retainer 232. The resilient arm 236 may also include a finger 238 extending from a distal portion of the resilient arm 236 toward the retainer 232. It is to be appreciated that the resilient arm 236 may be flexible so as to bend between an engaged position where the finger 238 is engaged with the retainer 232 and a disengaged position where the finger 238 is disengaged with the retainer 232. The clip 234 may comprise plastic, or may be at least partially realized by a soldered connection. In some versions, the surgical system 100 may further include a flex circuit 240 that connects the plurality of markers 184, as shown in FIG. 4A.

Figure 9B:
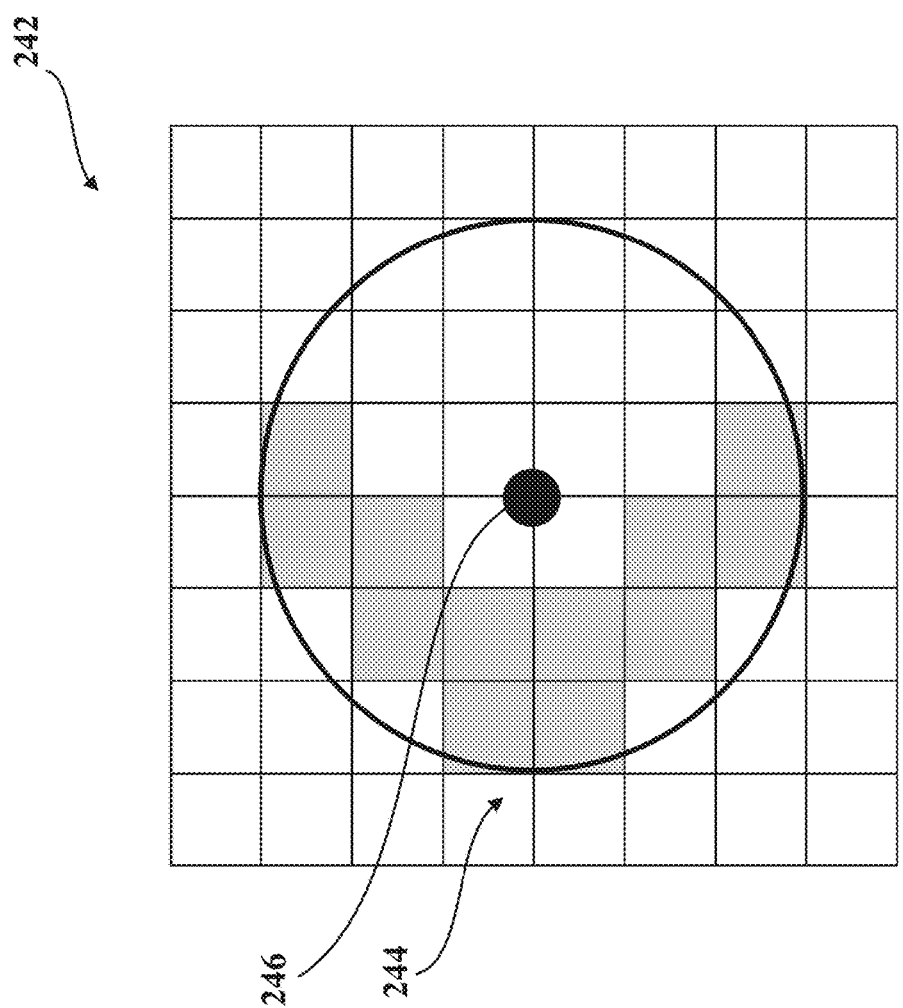
FIG. 9B is a schematic illustration of a partially occluded arrangement of pixels represented in tracking data generated by the optical position sensor.

Referring now to FIGS. 1 and 9A-9B, as noted above, the localizer 130 of the navigation system 102 employs one or more optical position sensors 150 to track states of the end effector tracker 182 within the field of view. In some versions, the navigation controller 128 may be to identify markers 184 within the field of view based on predetermined arrangements of pixels 242 represented by or otherwise acquired using tracking data generated by the optical position sensors 150 which corresponds to the shape and/or profile of light emitted across the output surface 200 of the diffuser 198. The predetermined arrangements of pixels 242 may be identified and/or determined based upon intensity of light or geometric shaping of light, among other possibilities. Other configurations are contemplated. The localizer 130 of the navigation system 102 may be configured to image the field of view and identify pixels in the image, the pixels corresponding with each of the markers 184 detected by the localizer 130. A first arrangement of pixels identified from a first perspective of the localizer 130 relative to the markers 184 is relatable, for example geometrically relatable, to a second arrangement of the pixels identified from a second perspective of the localizer 130 relative to the markers 184 different than the first perspective. The first arrangement of the pixels may be different than the second arrangement of the pixels. The arrangement of the pixels identifiable by the localizer 130 may be dependent upon the perspective of the localizer 130 relative to the markers 184.

In some versions, one or more of the plurality of markers 184 may be represented with at least partially elliptical profiles 244 in predetermined arrangements of pixels. The navigation system 102 may calculate a centroid 246 of the pixels associated with the marker 184. Here, the navigation system 102 may use the centroid 246 as the basis for responding to movement during the surgical procedure. In other words, if the centroid 246 is calculated to be in a different position as previously calculated, the navigation system 102 would determine that the robotic arm 156 has changed in position and/or orientation. However, because the diffuser 198 generates a uniform area of diffused light presented across the output surface 200 of the diffuser 198, even where a marker 184 becomes partially occluded, the navigation system 102 is still able to accurately calculate the centroid 246 of the pixels to accurately determine the position of the marker 184 and respond accordingly (compare FIGS. 9A-9B).

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A surgical system comprising:
   a tool for engaging a target site;
   a navigation system including a localizer to track states of trackers within a field of view;
   a patient tracker adapted for attachment relative to the target site;
   a robotic arm configured to maintain alignment of the tool relative to the target site, the robotic arm extending between a base end and a mount end arranged for movement relative to the base end; and
   an end effector attached to the mount end of the robotic arm and configured to support the tool, the end effector including an end effector tracker having a plurality of markers each including:
      a body having an inner bore surface defining a bore extending between an inlet and an outlet,
      a light module supported adjacent to the inlet and arranged to emit light into reflection with the inner bore surface, and
      a diffuser supported adjacent to the outlet to diffuse light reflected by the inner bore surface emitted by the light module, the diffuser having an output surface arranged to present diffused light across the output surface detectable by the localizer of the navigation system to enable tracking states of the end effector.

2. The surgical system as set forth in claim 1, wherein the inner bore surface has a bore parameter value, and the output surface has a diffuser parameter value different from the bore parameter value.

3. The surgical system as set forth in claim 2, wherein the bore parameter value and the diffuser parameter value are further defined as parameters associated with one or more of: transmission rate of light and/or reflectivity of light.

4. The surgical system as set forth in claim 1, wherein the light module is arranged to emit light through a conical zone extending from the light module, into the bore, and to the inner bore surface.

5. The surgical system as set forth in claim 4, wherein the body defines an axial body length between the inlet and the outlet;
   wherein the conical zone intersects the inner bore surface at an intersection location;
   wherein the conical zone defines an axial zone length between the light module and the intersection location; and
   wherein the axial body length is larger than the axial zone length.

6. The surgical system as set forth in claim 5, wherein the diffuser has an input surface facing away from the output surface and arranged to receive light reflected by the inner bore surface emitted by the light module, with the input surface disposed in spaced relation to the intersection location where the conical zone intersects the inner bore surface.

7. The surgical system as set forth in claim 1, wherein the output surface of the diffuser defines a radial width;
   wherein the body defines an axial body length between the inlet and the outlet; and
   wherein the axial body length is larger than the radial width.

8. The surgical system as set forth in claim 7, wherein the axial body length of the body is between 1.1 and 20 times greater than the radial width of the diffuser.

9. The surgical system as set forth in claim 7, wherein the radial width of the diffuser is between about 1 millimeter and about 8 millimeters.

10. The surgical system as set forth in claim 1, wherein the output surface has a circular profile.

11. The surgical system as set forth in claim 1, wherein the light module is disposed at least partially in the bore.

12. The surgical system as set forth in claim 1, wherein the diffuser is disposed at least partially in the bore.

13. The surgical system as set forth in claim 1, wherein the end effector tracker includes an end effector housing; and
   wherein the plurality of markers are each operatively attached to the end effector housing.

14. The surgical system as set forth in claim 13, wherein the body includes a flange arranged adjacent to the outlet of the bore shaped for engagement with the end effector housing.

15. The surgical system as set forth in claim 1, wherein the body further includes a retainer arranged adjacent to the inlet of the bore; and
   wherein each of the plurality of markers further includes a clip supporting the light module and coupled to the retainer to secure the light module to the body.

16. The surgical system as set forth in claim 15, wherein the clip includes a resilient arm shaped to engage the retainer.

17. The surgical system as set forth in claim 1, wherein the localizer of the navigation system includes an optical position sensor to track states of the end effector tracker within the field of view.

18. The surgical system as set forth in claim 17, wherein the navigation system includes a navigation controller configured to identify markers within the field of view based on predetermined arrangements of pixels represented in tracking data generated by the optical position sensor.

19. The surgical system as set forth in claim 18, wherein one or more of the plurality of markers are represented with at least partially elliptical profiles in predetermined arrangements of pixels.

20. A surgical system comprising:
   a tool for engaging a target site;
   a navigation system including a localizer to track states of trackers within a field of view;
   a patient tracker adapted for attachment relative to the target site;
   a robotic arm configured to maintain alignment of the tool relative to the target site, the robotic arm extending between a base end and a mount end arranged for movement relative to the base end; and an end effector attached to the mount end of the robotic arm and configured to support the tool, the end effector including an end effector tracker having a plurality of markers each including:
- a body having an inner bore surface defining a bore extending between an inlet and an outlet,
- a light module supported adjacent to the inlet and arranged to emit light into the bore, and
- a diffuser supported adjacent to the outlet to diffuse light emitted by the light module, the diffuser having an output surface arranged to present diffused light across the output surface detectable by the localizer of the navigation system to enable tracking states of the end effector.

* * * * *